(12) United States Patent
VerSteeg et al.

(10) Patent No.: US 9,197,857 B2
(45) Date of Patent: Nov. 24, 2015

(54) IP-BASED STREAM SPLICING WITH CONTENT-SPECIFIC SPLICE POINTS

(75) Inventors: William VerSteeg, Alpharetta, GA (US); Glenn Connery, Petaluma, CA (US); Kurt Kollmansberger, Spring Branch, TX (US); John Pickens, Newark, CA (US)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 12/434,480

(22) Filed: May 1, 2009

(65) Prior Publication Data

US 2009/0217318 A1 Aug. 27, 2009

Related U.S. Application Data

(63) Continuation-in-part of application No. 10/949,551, filed on Sep. 24, 2004, now abandoned, which is a continuation-in-part of application No. 11/933,483, filed on Nov. 1, 2007.

(51) Int. Cl.
*H04N 7/173* (2011.01)
*H04N 7/16* (2011.01)
(Continued)

(52) U.S. Cl.
CPC ............... *H04N 7/165* (2013.01); *G06Q 30/02* (2013.01); *H04N 21/23424* (2013.01); *H04N 21/2668* (2013.01); *H04N 21/64322* (2013.01); *H04N 21/812* (2013.01)

(58) Field of Classification Search
USPC ........................................................ 725/119
See application file for complete search history.

(56) References Cited

U.S. PATENT DOCUMENTS

| 4,788,656 A | 11/1988 | Sternberger |
| 4,907,277 A | 3/1990 | Callens |

(Continued)

FOREIGN PATENT DOCUMENTS

| WO | WO 03/084134 | 10/2003 |
| WO | WO 2006/096021 A1 | 9/2006 |

(Continued)

OTHER PUBLICATIONS

Marek Burza, Jeffrey Kang, Peter Van Der Stok; Adaptive Streaming of MPEG-based Audio/Video Content over Wireless Networks; Apr. 2007; p. 17-27; vol. 2, No. 2; Journal of Multimedia.

(Continued)

*Primary Examiner* — Jonathan V Lewis
(74) *Attorney, Agent, or Firm* — Merchant & Gould P.C.

(57) ABSTRACT

A method and system for conditioning a media stream for splicing are disclosed. In an embodiment, content-specific splice points, which correspond to a possible playout splice point within an original media stream, are identified for both audio and video components of the original media stream. Once the audio bitstream and video bitstream splice points are identified, the audio bitstream in the vicinity of the audio bitstream splice point is packetized into IP packets containing only audio with one of the audio-containing IP packets having an IP packet boundary that corresponds to the audio bitstream splice point and the video bitstream in the vicinity of the video bitstream splice point is packetized into IP packets containing only video with one of the video-containing IP packets having an IP packet boundary that corresponds to the video bitstream splice point. The conditioned original media stream is then transmitted downstream to a splicer.

20 Claims, 19 Drawing Sheets

(51) Int. Cl.
  *G06Q 30/02* (2012.01)
  *H04N 21/234* (2011.01)
  *H04N 21/2668* (2011.01)
  *H04N 21/643* (2011.01)
  *H04N 21/81* (2011.01)

(56) References Cited

U.S. PATENT DOCUMENTS

| | | |
|---|---|---|
| 4,996,663 A | 2/1991 | Nemes |
| 5,414,704 A | 5/1995 | Spinney |
| 5,450,449 A | 9/1995 | Kroon |
| 5,594,660 A * | 1/1997 | Sung et al. ............... 715/203 |
| 5,617,421 A | 4/1997 | Chin |
| 5,699,478 A | 12/1997 | Nahumi |
| 5,699,485 A | 12/1997 | Shoham |
| 5,726,989 A * | 3/1998 | Dokic ....................... 370/509 |
| 5,806,086 A | 9/1998 | Kimmel |
| 5,842,040 A | 11/1998 | Hughes |
| 5,859,660 A * | 1/1999 | Perkins et al. ............. 725/32 |
| 5,884,010 A | 3/1999 | Chen |
| 5,898,837 A | 4/1999 | Guttman |
| 5,917,830 A * | 6/1999 | Chen et al. ................ 370/487 |
| 5,943,347 A | 8/1999 | Shepard |
| 5,946,302 A | 8/1999 | Waclawsky |
| 5,956,721 A | 9/1999 | Douceur et al. |
| 5,995,488 A | 11/1999 | Kalkunte |
| 5,995,971 A | 11/1999 | Douceur et al. |
| 6,038,000 A * | 3/2000 | Hurst, Jr. .............. 375/240.26 |
| 6,101,193 A | 8/2000 | Ohba |
| 6,104,696 A | 8/2000 | Kadambi |
| 6,185,208 B1 | 2/2001 | Liao |
| 6,275,861 B1 | 8/2001 | Chaudri |
| 6,314,095 B1 | 11/2001 | Loa |
| 6,341,130 B1 | 1/2002 | Lakshman |
| 6,345,122 B1 * | 2/2002 | Yamato et al. ............. 382/232 |
| 6,356,545 B1 | 3/2002 | Vargo |
| 6,389,006 B1 | 5/2002 | Bialik |
| 6,421,802 B1 | 7/2002 | Schildbach |
| 6,434,153 B1 | 8/2002 | Yazaki |
| 6,438,695 B1 | 8/2002 | Maufer |
| 6,507,562 B1 | 1/2003 | Kadansky |
| 6,542,508 B1 | 4/2003 | Lin |
| 6,590,894 B1 | 7/2003 | Kerr |
| 6,611,502 B1 | 8/2003 | Seaman |
| 6,629,141 B2 | 9/2003 | Elzur |
| 6,658,000 B1 | 12/2003 | Raciborski |
| 6,665,637 B2 | 12/2003 | Bruhn |
| 6,671,722 B1 | 12/2003 | Stachura |
| 6,687,360 B2 | 2/2004 | Kung |
| 6,741,600 B1 | 5/2004 | Weiss |
| 6,757,654 B1 | 6/2004 | Westerlund |
| 6,760,309 B1 | 7/2004 | Rochberger |
| 6,771,657 B1 | 8/2004 | Elstermann |
| 6,801,496 B1 | 10/2004 | Saleh |
| 6,801,525 B1 | 10/2004 | Bodnar |
| 6,806,909 B1 * | 10/2004 | Radha et al. ............. 348/384.1 |
| 6,847,928 B1 | 1/2005 | Naka |
| 6,854,117 B1 | 2/2005 | Roberts |
| 6,868,069 B2 | 3/2005 | Knobbe |
| 6,909,702 B2 | 6/2005 | Leung |
| 6,909,743 B1 * | 6/2005 | Ward et al. ............. 375/240.01 |
| 6,928,482 B1 | 8/2005 | Ben-Nun |
| 6,971,119 B1 | 11/2005 | Arsenault et al. |
| 6,993,081 B1 * | 1/2006 | Brunheroto et al. ..... 375/240.28 |
| 7,010,611 B1 | 3/2006 | Wiryaman |
| 7,013,267 B1 | 3/2006 | Huart et al. |
| 7,036,049 B2 | 4/2006 | Ali |
| 7,055,174 B1 | 5/2006 | Cope |
| 7,062,689 B2 | 6/2006 | Slobodnik |
| 7,096,481 B1 * | 8/2006 | Forecast et al. ............. 725/32 |
| 7,096,488 B1 | 8/2006 | Zhang et al. |
| 7,106,749 B1 | 9/2006 | Darshan et al. |
| 7,139,242 B2 | 11/2006 | Bays |
| 7,154,855 B1 | 12/2006 | Hardy |
| 7,206,385 B2 | 4/2007 | Ethier |
| 7,248,682 B1 | 7/2007 | Oran |
| 7,269,157 B2 | 9/2007 | Klinker |
| 7,286,467 B1 | 10/2007 | Sylvain |
| 7,305,464 B2 | 12/2007 | Phillipi |
| 7,324,499 B1 | 1/2008 | Borella |
| 7,430,222 B2 * | 9/2008 | Green et al. ................ 370/486 |
| 7,432,950 B2 * | 10/2008 | Deleam et al. ............ 348/14.08 |
| 7,436,830 B2 | 10/2008 | Ben-Nun et al. |
| 7,453,829 B2 * | 11/2008 | Pasha et al. ................ 370/261 |
| 7,454,494 B1 | 11/2008 | Hedayat |
| 7,483,400 B2 | 1/2009 | Kuusinen et al. |
| 7,496,044 B1 | 2/2009 | Wing |
| 7,633,879 B2 | 12/2009 | Ramalho |
| 7,720,432 B1 | 5/2010 | Colby et al. |
| 7,817,546 B2 | 10/2010 | Filsfils et al. |
| 7,835,406 B2 | 11/2010 | Oran et al. |
| 7,848,478 B1 | 12/2010 | Huffman |
| 7,911,946 B2 | 3/2011 | Poli et al. |
| 7,936,695 B2 | 5/2011 | Oran |
| 7,940,685 B1 | 5/2011 | Breslau et al. |
| 7,962,942 B1 | 6/2011 | Craner |
| 8,023,419 B2 | 9/2011 | Oran |
| 8,352,590 B2 | 1/2013 | Sankaran et al. |
| 8,867,385 B2 | 10/2014 | Oran |
| 8,966,551 B2 | 2/2015 | VerSteeg et al. |
| 2001/0013123 A1 * | 8/2001 | Freeman et al. ............. 725/34 |
| 2002/0016856 A1 | 2/2002 | Tallegas |
| 2002/0064273 A1 | 5/2002 | Tomikawa |
| 2002/0075895 A1 | 6/2002 | Yamaguchi |
| 2002/0116501 A1 | 8/2002 | Ho |
| 2002/0122418 A1 | 9/2002 | Bernstein |
| 2002/0131425 A1 | 9/2002 | Shalom |
| 2002/0141392 A1 | 10/2002 | Tezuka |
| 2002/0150050 A1 | 10/2002 | Nathanson |
| 2002/0154694 A1 * | 10/2002 | Birch ..................... 375/240.05 |
| 2002/0194361 A1 | 12/2002 | Itoh |
| 2002/0194589 A1 * | 12/2002 | Cristofalo et al. ........... 725/32 |
| 2002/0196850 A1 * | 12/2002 | Liu et al. ................ 375/240.12 |
| 2003/0014705 A1 | 1/2003 | Suzuki |
| 2003/0023710 A1 | 1/2003 | Corlett |
| 2003/0026241 A1 | 2/2003 | Ono |
| 2003/0048786 A1 | 3/2003 | D'Annunzio |
| 2003/0086425 A1 | 5/2003 | Bearden |
| 2003/0117959 A1 | 6/2003 | Taranov |
| 2003/0120789 A1 | 6/2003 | Hepworth et al. |
| 2003/0123556 A1 * | 7/2003 | Komori ................... 375/240.26 |
| 2003/0145077 A1 | 7/2003 | Khan |
| 2003/0145233 A1 | 7/2003 | Poletto et al. |
| 2003/0198249 A1 | 10/2003 | Klein |
| 2003/0204617 A1 | 10/2003 | Buchsbaum |
| 2003/0227917 A1 | 12/2003 | Maher |
| 2004/0037267 A1 | 2/2004 | Bennett |
| 2004/0037320 A1 | 2/2004 | Dickson |
| 2004/0042456 A1 | 3/2004 | Dittmann |
| 2004/0071135 A1 | 4/2004 | Jimmei |
| 2004/0073641 A1 | 4/2004 | Minhazuddin |
| 2004/0095894 A1 | 5/2004 | Eloranta |
| 2004/0141502 A1 | 7/2004 | Corson |
| 2004/0179513 A1 | 9/2004 | Smith |
| 2004/0181599 A1 | 9/2004 | Kreusch |
| 2004/0185836 A1 | 9/2004 | Pelaez |
| 2004/0203787 A1 | 10/2004 | Naghian |
| 2004/0208186 A1 | 10/2004 | Eichen et al. |
| 2004/0252694 A1 | 12/2004 | Adhikari |
| 2004/0264433 A1 | 12/2004 | Melpignano |
| 2005/0015816 A1 * | 1/2005 | Christofalo et al. .......... 725/136 |
| 2005/0022253 A1 * | 1/2005 | Chen et al. ................. 725/135 |
| 2005/0102423 A1 | 5/2005 | Pelavin |
| 2005/0169174 A1 | 8/2005 | Apostolopoulos et al. |
| 2005/0182850 A1 | 8/2005 | Kohno |
| 2005/0220035 A1 | 10/2005 | Ling |
| 2005/0229232 A1 | 10/2005 | Champel et al. |
| 2005/0232227 A1 | 10/2005 | Jorgenson |
| 2005/0243733 A1 | 11/2005 | Crawford |
| 2005/0246456 A1 * | 11/2005 | Parry et al. ................ 710/53 |
| 2005/0276276 A1 | 12/2005 | Davis |
| 2006/0002366 A1 | 1/2006 | Kawaguchi |
| 2006/0010243 A1 | 1/2006 | DuRee |
| 2006/0029065 A1 | 2/2006 | Fellman |

(56) References Cited

U.S. PATENT DOCUMENTS

| | | |
|---|---|---|
| 2006/0031445 A1 | 2/2006 | Rajan |
| 2006/0031510 A1 | 2/2006 | Beck |
| 2006/0059277 A1 | 3/2006 | Zito |
| 2006/0059411 A1 | 3/2006 | Dacosta |
| 2006/0075449 A1 | 4/2006 | Jagadeesan et al. |
| 2006/0106961 A1 | 5/2006 | Ebata |
| 2006/0107187 A1 | 5/2006 | Hannuksela |
| 2006/0114855 A1 | 6/2006 | Zheng |
| 2006/0126528 A1 | 6/2006 | Ramalho |
| 2006/0130118 A1 | 6/2006 | Damm |
| 2006/0143300 A1 | 6/2006 | See |
| 2006/0182034 A1 | 8/2006 | Klinker |
| 2006/0221837 A1 | 10/2006 | Gardner |
| 2006/0221930 A1 | 10/2006 | Sweeney |
| 2006/0280207 A1 | 12/2006 | Guarini et al. |
| 2007/0036087 A1 | 2/2007 | Kangru |
| 2007/0049307 A1 | 3/2007 | Mueckenheim |
| 2007/0061460 A1 | 3/2007 | Khan |
| 2007/0127391 A1 | 6/2007 | Goodman |
| 2007/0199052 A1 | 8/2007 | Sankaran |
| 2007/0230486 A1 | 10/2007 | Zafirov |
| 2008/0037425 A1 | 2/2008 | Pan et al. |
| 2008/0037864 A1 | 2/2008 | Zhang |
| 2008/0069002 A1 | 3/2008 | Savoor |
| 2008/0159279 A1 | 7/2008 | Younis |
| 2008/0170117 A1 | 7/2008 | Xiao |
| 2008/0189754 A1 | 8/2008 | Yoon et al. |
| 2008/0215704 A1 | 9/2008 | Curcio et al. |
| 2008/0220765 A1 | 9/2008 | Chu |
| 2008/0259924 A1 | 10/2008 | Gooch |
| 2008/0285452 A1 | 11/2008 | Oran |
| 2008/0285463 A1 | 11/2008 | Oran |
| 2008/0310316 A1 | 12/2008 | Oran |
| 2008/0317011 A1 | 12/2008 | Datta |
| 2009/0010158 A1 | 1/2009 | Filsfils |
| 2009/0013129 A1 | 1/2009 | Bondurant |
| 2009/0028142 A1* | 1/2009 | Schmidt et al. ............... 370/389 |
| 2009/0119722 A1 | 5/2009 | VerSteeg et al. |
| 2010/0039955 A1 | 2/2010 | Taylor et al. |
| 2011/0191469 A1 | 8/2011 | Oran |
| 2013/0198788 A1* | 8/2013 | Barger et al. .................. 725/93 |
| 2015/0163274 A1 | 6/2015 | VerSteeg et al. |

FOREIGN PATENT DOCUMENTS

| | | |
|---|---|---|
| WO | WO 2007/047479 A2 | 4/2007 |
| WO | WO 2009/058645 | 5/2009 |

OTHER PUBLICATIONS

International Preliminary Report dated May 4, 2010 cited in Application No. PCT/US2008/080882, 8 pgs.
U.S. Office Action dated Oct. 25, 2010 cited in U.S. Appl. No. 11/933,483, 20 pgs.
U.S. Office Action dated May 3, 2011 cited in U.S. Appl. No. 11/933,483, 15 pgs.
U.S. Final Office Action dated Oct. 21, 2011 cited in U.S. Appl. No. 11/933,483, 17 pgs.
D. Singer & H. Desineni, "A General Mechanism for RPT Header Extensions," draft-ietf-avt-rtp-hdrext-12tx, Feb. 26, 2007, 20 pgs.
J. Brassil et al., "Structuring Internet Media Streams With Cueing Protocols," IEEE/ACM Transactions on Networking, New York, NY, vol. 10, No. 4, Aug. 1, 2002, pp. 1-11.
"MPEG-7 Overview," (latest version: Version 10), Oct. 2004, International Organisation for Standardisation Organisation Internationale de Normalisation ISO/IEC JTC1/SC29/WG11 Coding of Moving Pictures and Audio, N6828, 93 pgs.
P. Marques et al., "Monitoring Emerging IPV6 Wireless Access Networks," IEEE Wireless Communications, vol. 12, No. 1, Feb. 2005, pp. 47-53.
Chinese First Office Action dated Sep. 27, 2012 cited in Application No. 200880123531.2, 27 pgs.
Chinese Rejection Decision dated Jan. 27, 2014 cited in Application No. 200880123531.2, 28 pgs.
U.S. Office Action dated Feb. 27, 2013 cited in U.S. Appl. No. 13/080,585, 30 pgs.
U.S. Final Office Action dated Sep. 26, 2013 cited in U.S. Appl. No. 13/080,585, 27 pgs.
U.S. Office Action dated Feb. 5, 2014 cited in U.S. Appl. No. 13/080,585, 25 pgs.
T.V. Lakshman et al., "High-Speed Policy-Based Packet Forwarding Using Efficient Multi-Dimensional Range Matching," 1998, ACM SIGCOMM Computer Communication Review, vol. 28, No. 4, 12 pgs.
Pendleton et al., "Session Initiation Package for Voice Quality Reporting Event," Sipping Working Group, 2006, pgs. 1-24.
J. Postel, "User Datagram Protocol," retrieved from http://www.faqs.org/rfcs/rfc768.html on Jun. 13, 2009, originally published Aug. 28, 2980, pp. 1-3.
Information Sciences Institute, University of Southern California; Internet Protocol, DARPA Internet Program Protocol Specification, Sep. 1981, pp. 1-46.
Information Sciences Institute, University of Southern California; Transmission Control Protocol, DARPA Internet Program Protocol Specification, Sep. 1981, pp. 1-84.
R. Braden, "Network Working Group, "Requirements for Internet Hosts—Communication Layers, Oct. 1989, p. 1-90.
Degermark et al., "IP Header Compression," Feb. 1999, RFC 2507, 42 pgs.
K. Hamzeh et al., "Point-to-Point Tunneling Protocol (PPTP)", RFC 2637, Jul. 1999, 57 pgs.
Liao et al., "Adaptive recovery techniques for real-time audio streams," IEEE INFOCOM 2001, Twentieth Annual Joint Conference of the IEEE Computer and Communications Societies, Proceedings, Apr. 22-26, 2001, vol. 2, 9 pgs.
Rosenburg, "An Offer/Answer Model with Session Description Protocol (SDP)," Jun. 2002, RFC 3264, 26 pgs.
T. Friedman et al., "RTP Control Protocol Extended Reports (RTCP XR)", RFC 3611, Nov. 2003, pp. 1-56.
Kevin Song X., "The ABC's of Network Security," The Certified Security Professional, Certification Magazine, Feb. 2004, 3 pgs.
B. Thompson et al., Tunneling Multiplexed Compressed RPT (TCRTP), Nov. 2005, RFC 4170, 22 pgs.
Jonson et al., Robust Header Compression (ROHC): A Link-Layer Assisted Profile for IP/UDP/RTP, Jan. 2006, RFC 4362, 21 pgs.
Welch et al., "A Proposed Media Delivery Index (MDI)," Apr. 2006, RFC 4445, 9 pgs.
Schulzrinne et al., "RTP: A Transport Protocol for Real-Time Applications," Network Working Group, RFC 3550, 2003, pp. 1-92.
Chinese Second Office Action dated Jun. 5, 2013 cited in Application No. 200880123531.2, 27 pgs.
U.S. Office Action dated Dec. 9, 2013 cited in U.S. Appl. No. 11/933,483, 26 pgs.
U.S. Final Office Action dated May 27, 2014 cited in U.S. Appl. No. 11/933,483, 12 pgs.
European Office Action dated Nov. 10, 2014 cited in Application No. 08 845 733.8, 4 pgs.
Chinese Office Action dated Mar. 31, 2015 cited in Application No. 200880123531.2, 17 pgs.
Chinese Notification of Reexamination dated Aug. 26, 2015 cited in Application No. 200880123531.2, 17 pgs.

* cited by examiner

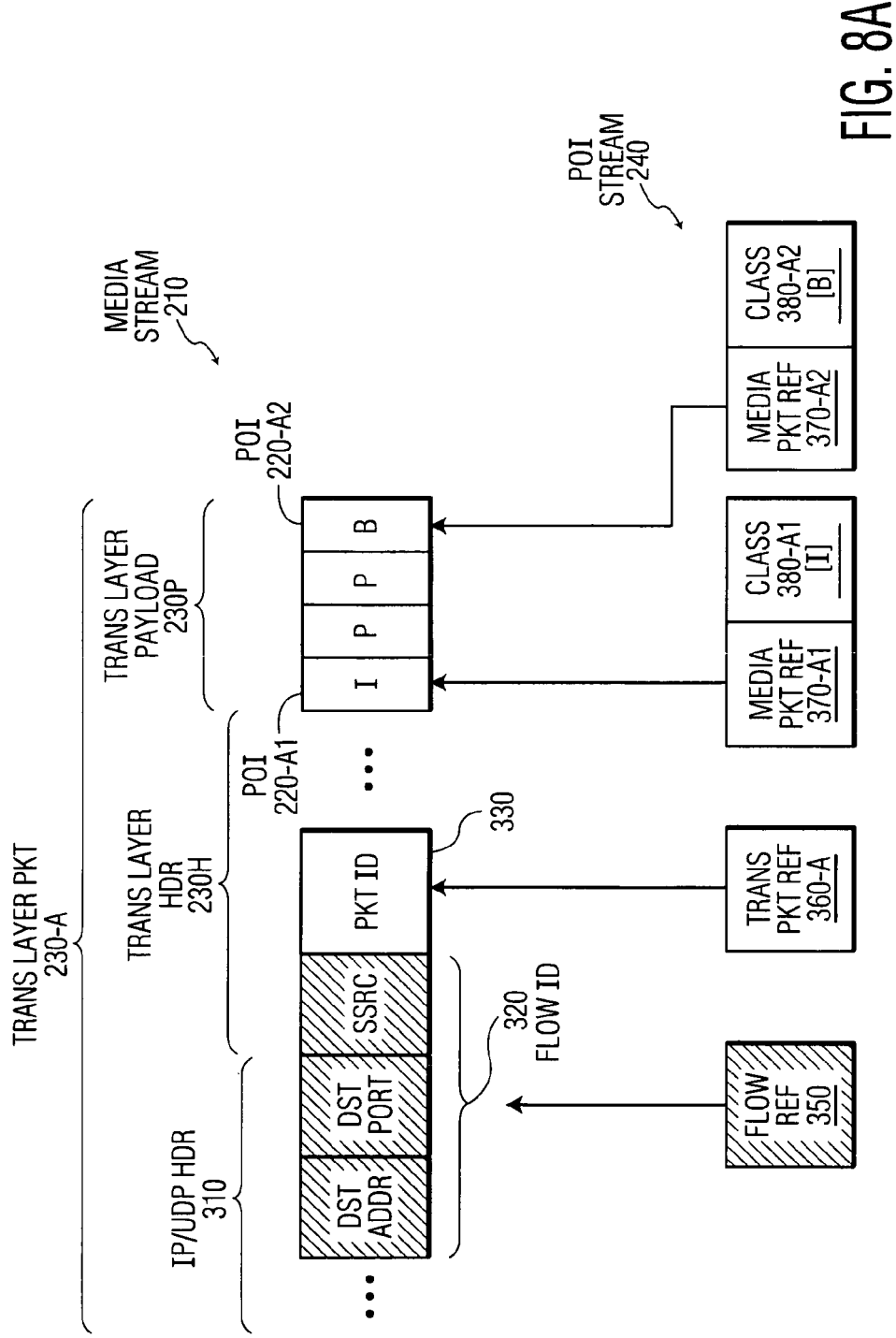

IP-BASED STREAM SPLICING WITH CONTENT-SPECIFIC SPLICE POINTS

CROSS REFERENCE TO RELATED APPLICATIONS

The current application is a continuation-in-part of patent application Ser. No. 10/949,551, filed Sep. 24, 2004, titled, "DISTRIBUTED ARCHITECTURE FOR DIGITAL PROGRAM INSERTION IN VIDEO STREAMS DELIVERED OVER PACKET NETWORK," and patent application Ser. No. 11/933,483, filed Nov. 1, 2007, titled, LOCATING POINTS OF INTEREST USING REFERENCES TO MEDIA FRAMES WITHIN A PACKET FLOW, both of which are incorporated by reference herein.

TECHNICAL FIELD

The present invention relates generally to the field of digital video streaming technology, and more particularly, to personalized or targeted insertion of digital media into a digital media stream.

BACKGROUND

The cable and satellite television industry has experienced explosive growth in recent years. Not surprisingly, the sale and insertion of local and regional advertisements have become a huge source of revenue for cable television system operators that deliver programs to their subscriber customers. In the past, analog video ads were commonly inserted into analog satellite video feeds by the local cable operators. Most often, analog ads were stored on tape and switched into the network feed by analog video switches, with the switching process being triggered by a cue tone sequence on the associated audio feeds delivered together with the video feed and received by a satellite receiver. As more cable systems have been converted to deliver digitally compressed video to the customer's home, cable operators have developed a variety of new technologies for inserting digital advertising content into the digital bitstream.

In the digital realm, video programs are typically encoded into MPEG-2 video streams that are then multiplexed into a Multi-Program Transport Stream (MPTS) that is up-linked to an orbiting satellite. The Society of Cable Television Engineers Standard 35 (SCTE 35) is a cable protocol that supports Digital Program Insertion (DPI) in MPEG-2 streams by defining digital cue tone signals that are inserted in the digital video stream at the "head-end" during the network encoding process. These cue tone messages exist as specific data packets with specific header information. Common cue tone signals include a pre-roll signal, which is sent approximately 5 to 8 seconds before splice time to indicate an upcoming available advertisement time slot (frequently referred to as an "avail"); a start signal, which marks the beginning of the avail and is used to trigger switching from the original video stream into the ad stream; and a stop signal, which occurs at the end of the avail for switching back to the original video stream. In DPI, digital cue tones in the form of Splice Information Tables (SIT) are typically inserted in the transport stream in the uplink and detected by a digital splicer at the local or regional head-end. A cue tone sequence is described in U.S. Pat. No. 5,600,366, which patent teaches digital ad insertion in video programming in which switchovers from network programming to local advertising occurs at packet or frame boundaries upon detection of idle information from a network source.

A conventional system for digital ad insertion is depicted in FIG. 1, which shows a digital video broadcast (DVB) transport stream from a satellite feed with SCTE 35 cue tones flowing into a centralized splicer 11. Splicer 11 also receives an ad transport stream from an ad server 12 that provides digital storage and streaming of various advertisements. Ads are typically selected by server 12 based on avail identification (avail-ID) information and program-ID ("PID") information carried in the in-stream splice information tables. Control signaling between splicer 11 and ad server 12 is defined by the SCTE 30 standard protocol. An ad management system 13 may also interface with server 12 for handling ad scheduling, management and billing systems. Ad management system 13 may also provide user profiling, demographics and database analysis to determine which ads should be targeted at particular customers or end-users. By way of example, a computer-based method and system for targeting of advertisements and promotions based on past purchase behavior as a predictor of future purchase behavior is described in U.S. Pat. No. 6,735,572.

Splicer 11 performs the function of switching between the original video stream and the ad transport stream based on the information present in the SIT cue signals. In the example shown, for the same input signal, splicer 11 splices two different ads, thereby producing two video output streams containing different targeted ads that are then delivered to the end users (e.g., targeted customer groups 21 and 22) via an Internet Protocol (IP) distribution network 15. Network 15 typically comprises a packet-based transmission medium having a plurality of edge devices (e.g., routers) 16-18 that provides connectivity across a dispersed geographic region.

One of the drawbacks of the conventional system shown in FIG. 1 is that the number of video output streams that can be delivered to different targeted groups is limited by the available bandwidth of distribution network 15. Hence, only a limited amount of targeting can be achieved. In other words, although the centralized architecture shown in FIG. 1 permits some targeting of ads to multiple groups, the problem is that bandwidth consumption places an upper limit on the amount of targeting that can be performed. Alternatively, the same DPI splicers used today in the central head-end location may be distributed to the edge locations of network 15. However, the problem with this approach is that it adds significant cost to the overall system, since expensive splicers are required at multiple edge locations.

Yet another problem with existing DPI systems is that it is often difficult to insure a seamless, high-quality transition into and out of the network stream. The reason for this difficulty lies in the fact that MPEG video streams comprise different types of frames that do not include all of the data to be displayed at any given time. In addition, the resulting stream follows a stringent buffer model. For instance, Inter-frames, or I-frames, are the only type of frame that is not coded with reference to any other frame; P-frames are coded predicatively from a previous I-frame or P-frame; B-frames are coded predicatively from I-frames and P-frames.

One of the complicating factors in the splicing of streams is that in order to be properly decoded, a B-frame associated with a group of pictures ("GOPs", which usually consist of 15 frames) may need to reference the I-frame of a next GOP. To avoid delays in the decoding process, complex elementary/picture level (i.e., at the MPEG layer) processing of the video stream often times must be performed. That is, expensive low-level processing is required to condition the digital video stream in order to guarantee seamless splicing of ads.

Transport stream level splicing is a digital splicing technique that avoids some of the drawbacks inherent in elementary/picture level splicing. In transport stream level splicing, switching between streams takes place only on transport packet boundaries. Transport packets are typically 188 bytes long. Although this technique is simple and relatively inexpensive, it only works well in certain limited cases, such as well-conditioned streams in which there are no open GOPS, i.e., a GOP having a B-frame that can only be decoded by reference to the I-frame of a next GOP, or when the pictures are perfectly aligned with the packet boundary.

Thus, there remains an unsatisfied need for a new DPI architecture that overcomes the aforementioned problems in the prior art.

By way of further background, U.S. Pat. No. 6,718,553 teaches a system and method for delivery of digital broadcast television programming from a centralized aggregation headend to subscribers in multiple markets using an interconnected terrestrial fiber optic network. Additionally, U.S. Pat. No. 6,505,169 teaches a method for adaptive ad insertion in streaming multimedia content. A method for splicing data packets of a commercial message into a pre-existing data stream that complies with the MPEG transmission standard is disclosed in U.S. Pat. No. 5,917,830. Finally, U.S. Pat. No. 6,044,081 teaches a hybrid communications system and multimedia system that allows private network signaling to be routed over a packet network.

SUMMARY

In an embodiment, content-specific splice points, which correspond to a possible playout splice point within an original media stream, are identified for both audio and video components of the original media stream. Because of the temporal difference between audio transport stream packets and video transport stream packets, the audio bitstream splice point is temporally different from the video bitstream splice point. For example, the audio bitstream splice point temporally leads the video bitstream splice point by an encoder-specific time interval. Once the audio bitstream and video bitstream splice points are identified, the audio bitstream in the vicinity of the audio bitstream splice point is packetized into IP packets containing only audio with one of the audio-containing IP packets having an IP packet boundary that corresponds to the audio bitstream splice point and the video bitstream in the vicinity of the video bitstream splice point is packetized into IP packets containing only video with one of the video-containing IP packets having an IP packet boundary that corresponds to the video bitstream splice point. Content-specific splice points and may also be identified and separately packetized for other data within the original media stream, such as Entitlement Control Messages (ECMs), MPEG private data, and/or MPEG control data.

The conditioned original media stream, which includes an audio IP packet with a boundary that corresponds to the audio bitstream splice point, a video IP packet with a boundary that corresponds to the video bitstream splice point, and possibly other content-specific IP packets with boundaries that correspond to content-specific splice points, is transmitted downstream to a splicer, for example, a splicer that is located at a PE device or a STB. The splicer can insert a secondary media stream at any of the possible playout splice points using IP packet splicing. Because the content-specific splice points are specific to a component of the original media stream (e.g., the audio, the video, and other data) there is no need to add silence or black information to IP packets and IP packet splicing can occur seamlessly without any service interruption or degradation.

In an embodiment, a method for conditioning a media stream for splicing involves receiving a media stream, wherein the media stream includes an audio bitstream and a video bitstream, identifying a possible playout splice point within the media stream, identifying an audio bitstream splice point within the audio bitstream as a function of the possible playout splice point, packetizing the audio bitstream into audio IP packets with one of the audio IP packets having an IP packet boundary that corresponds to the audio bitstream splice point, identifying a video bitstream splice point within the video bitstream as a function of the possible playout splice point, wherein the video bitstream splice point is temporally different from the audio bitstream splice point, packetizing the video bitstream into video IP packets with one of the video IP packets having an IP packet boundary that corresponds to the video bitstream splice point, generating a reference to the audio bitstream splice point, generating a reference to the video bitstream splice point, and transmitting the audio bitstream splice point reference, the video bitstream splice point reference, the audio IP packets, and the video IP packets to a splicer.

In an embodiment, a system for conditioning a media stream for splicing includes a conditioner, a point of interest producer, and a transmitter. The conditioner is configured to identify a possible playout splice point within a media stream, wherein the media stream includes an audio bitstream and a video bitstream, identify an audio bitstream splice point within the audio bitstream as a function of the possible playout splice point, packetize the audio bitstream into audio IP packets with one of the audio IP packets having an IP packet boundary that corresponds to the audio bitstream splice point, identify a video bitstream splice point within the video bitstream as a function of the possible playout splice point, wherein the video bitstream splice point is temporally different from the audio bitstream splice point, and packetize the video bitstream into video IP packets with one of the video IP packets having an IP packet boundary that corresponds to the video bitstream splice point. The point of interest producer is configured to generate a reference to the audio bitstream splice point, to generate a reference to the video bitstream splice point, and to generate a reference to any other stream for which a content-specific splice point is identified. The transmitter is configured to transmit the audio bitstream splice point reference, the video bitstream splice point reference, the audio IP packets, and the video IP packets to a splicer.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 8A-C are block diagrams showing how syntax and encoding of points-of-interest information is performed in an embodiment of a system and method for utilizing locating points of interest.

DESCRIPTION OF EXAMPLE EMBODIMENTS

A system for fine grain or personalized targeted insertion of a secondary media stream into an original media stream is described. In the following description, numerous specific details are set forth, such as device types, protocols, configurations, etc., in order to provide a thorough understanding of the present invention. However, persons having ordinary skill in the networking arts will appreciate that these specific details may not be needed to practice the present invention.

In the context of the present application, it should be understood that a computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component interconnect (PCI) bus. The processor subsystem may comprise a single-chip processor and system controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

Figure 1:
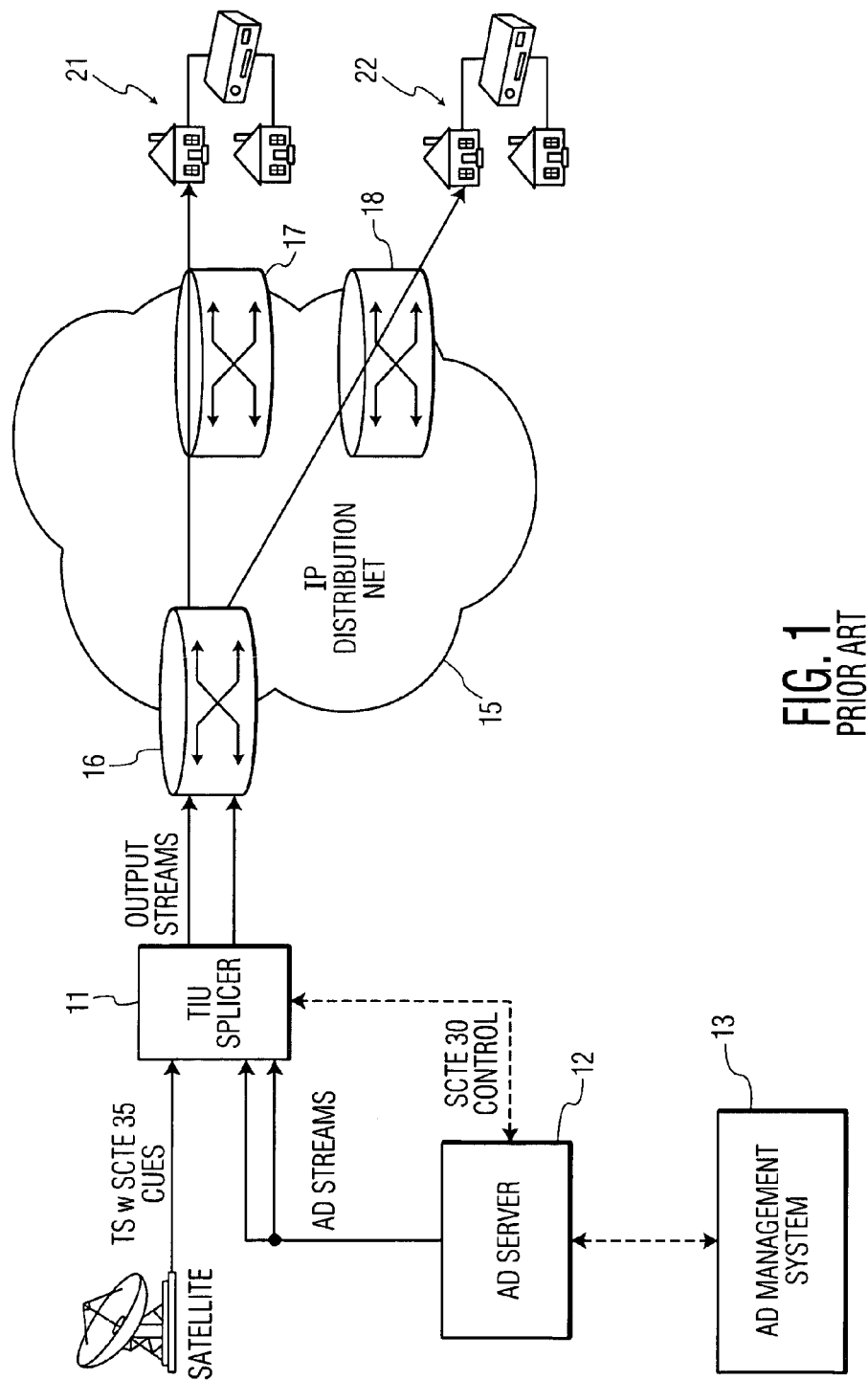
FIG. 1 is a prior art system for digital ad insertion.
Figure 2:
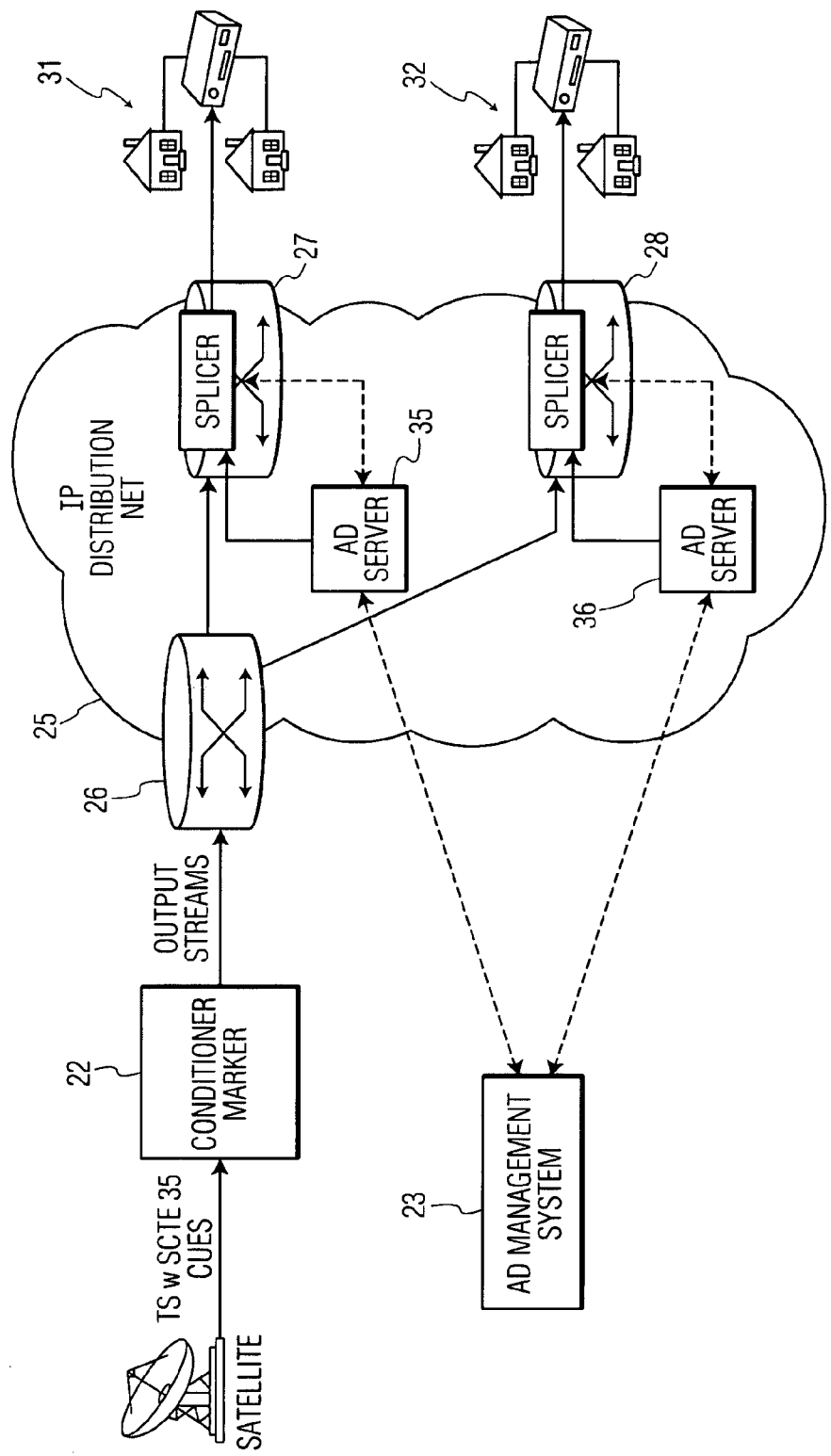
FIG. 2 is a block level diagram of a distributed architecture for targeted ad-insertion.

With reference now to FIG. 2, there is shown an example of a distributed architecture for targeted ad-insertion. In an embodiment, the centralized splicer function is disaggregated or segregated and the centralized splicer is replaced with a centralized conditioner/marker device, which enables relatively simple IP-packet level splicing in distributed downstream locations. A head-end conditioner/marker device creates IP splice points, with inexpensive, distributed IP-splicers being utilized downstream in the distribution network to insert personalized ads or other multimedia programs into a media stream such as a live television multicast program. In the architectural diagram of FIG. 2, a single output stream created by conditioner/marker unit 22 is received by PE device 26 for distribution to end-user groups 31 & 32 via PE devices 27 & 28, respectively. The IP-packet level splicing function is performed by splicers in, or associated with, provider edge (PE) devices 27 and 28. As can be seen, PE devices 27 & 28 are located on the edge of distribution network 25, facing the targeted user groups 31 & 32, respectively.

In FIG. 2, head-end conditioner/marker unit 22 receives a video transport stream embedded with SCTE 35 cue tone signals. In operation, conditioner/marker unit 22 detects the SIT cue signals received in the input transport stream and, based on those cue signals, performs elementary and picture level processing functions. These functions may include closing open GOPs, anchor frame adjustment, inserting dummy or black frames when appropriate, ensuring that the MPEG decoder buffer is at the appropriate fullness level for splicing, and the creation of explicit transport stream splice-points. Conditioner/marker unit 22 may also remap the video and audio PIDs to a commonly agreed upon set of PIDs.

Conditioner/marker unit 22 is a network node that typically includes a generic networked computer platform as described above. In operation, each of the functions presently described may be performed by execution of a program of instructions on the processor of a network node or generic server or router which includes conditional/marker unit 22.

In addition to performing elementary and picture level processing functions, conditioner/marker unit 22 may also adjust the Real-Time Transport Protocol (RTP)/User Datagram Protocol (UDP)/IP packetization size to ensure that the splice-point occurs at an IP transport packet boundary. This adjustment may be performed in accordance with widely-used Society of Motion Picture and Television Engineer (SMPTE) standard known as SMPTE-312M, which is a standard that defines splice points for MPEG-2 transport streams. Additionally, unit 22 may mark the IP-splice point using a header field or inserting a special marking packet. For example, if RTP is used, marking may be performed by inserting a packet that contains splice information, and which packet is identified by a special splice information ("splice- _info") payload type. Conditioner/marker unit 22 may also mark the corresponding audio RTP and adjust the packetization size to ensure that the splice-point occurs at an IP packet boundary. In certain cases, conditioner/marker unit 22 may add "silence" information to the packet in order to make up for audio/video time differences.

Another option is to add certain proprietary information on the RTP packet header that indicates the switching point. The ad video bitstream bit rate may be specified within this information.

Still another option is to have conditioner/marker unit 22 insert a default local or regional ad, which ad may be replaced by one or more targeted ads by a downstream IP-splicer (e.g., one of the splicers shown associated with PE devices 27 & 28).

It is to be further appreciated that the digital video elementary format employed in the system and method described herein is not limited to MPEG-2, but may also include MPEG-1, MPEG-4, H.26x, and/or any future video compression standards. That is, the video transport port stream shown in the figures and described herein is not limited to MPEG-2 transport. In other words, the system and method described herein has applicability to other types of digital video transport streams such as directTV transport streams, RTP streams and any other future digital video transport streams.

According to the architecture shown in FIG. 2, conditioner/marker unit 22 does not perform ad splicing. Instead, the IP-splicer functionality is located in PE devices (e.g., routers or switches) 27 & 28 on the multicast tree, so that targeted ads may be inserted for each edge multicast branch, which, in this example, comprises groups 31 & 32. The IP-splicer function may be realized by adding IP-slicing device technology to a conventional edge switch, router, or edge video server platform. In so-called "last-mile" networks, such as Direct Subscriber Line (DSL) and Ethernet-To-The-Home (ETTH) networks, the splicers associated with, or integrated on, PE devices 27 & 28 may insert personalized targeted ads for the streams sent to each home.

In an alternative embodiment, the splicers may be distributed into customer premises equipment (CPE) such as set-top boxes (STBs) of the end-users, with the content for insertion (e.g., ads) being stored locally or downloaded for storage therein. That is, rather than locating the splicer function in the PE devices associated with IP network 25, the splicers may be integrated into the set-top boxes associated with individual households. A STB is an electronic device that is connected to a communication channel, such as a phone, ISDN, or cable television line, and produces output on a conventional television screen. Set-top boxes are commonly used to receive and decode digital television broadcasts and to interface with the Internet through the user's television instead of a PC. Set-top boxes fall into several categories, from the simplest that receive and unscramble incoming television signals to the more complex that will also function as multimedia desktop computers that can run a variety of advanced services such as videoconferencing, home networking, IP telephony, video-on-demand (VoD) and high-speed Internet TV services.

In an embodiment, the IP-splicers function to receive conditioned multicast live television video streams and detect splice information and splice points, which may be marked, i.e., by conditioner/marker unit 22. The distributed splicers utilize this splice information to signal an associated content (e.g., ad) insertion server to retrieve one or more content pieces (e.g., ads) for insertion into the video bitstream. In the example of FIG. 2, the splicer of PE device 27 signals ad server 35, and the splicer of PE device 28 signals ad server 36, to effectuate this purpose. Existing ad servers, such as those commercially sold by nCUBE Corporation of Beaverton, Oreg., may be used as servers 35 & 36. Each of ad servers 35 may communicate with a centralized ad management system 23 for handling ad scheduling, management and billing. Ad management system 23 may also provide store and provide information used to target at customers having certain demographics or viewing habits.

It should be understood that ad servers 35 & 36 need not be co-located or dedicated for use with the splicers associated with respective PE devices 27 & 28. That is, in certain embodiments, the ad servers may be remotely located or may comprise a single centralized ad server that serves numerous splicers of different edge devices. For example, the ad server functionality may be implemented by an ad server blade or ad cache inserted into an edge router or switch. In still another embodiment, the ad management function may be distributed throughout the IP distribution network rather than being centralized as shown in FIG. 2.

In operation, when an IP splice-point is detected, the IP-splicer switches between the original bitstream and the ad-bitstream. This switching occurs at the marked IP packet boundaries, and results in a single output stream sent to a particular targeted group or household (e.g., 31 or 32). This single stream may include both audio and video streams. Note that such an example represents the finest level of granularity for ad targeting, since basically there is a splicer/edge device associated with each targeted group or household. Such an implementation also maximizes available bandwidth since only the single output stream generated by conditioner/marker 22 need be distributed across IP network 25.

Another possibility is to move the IP-splicer function into a router or switch within network 25, but which device is not an edge device. In embodiments where the splicer function is distributed within network away from the edge devices (or where there are more than one STBs receiving the signal feed), multiple output streams may need to be generated by the splicer. Each of the output streams generated by the IP-splicer is sent—with the inserted targeted ad—to the appropriate branch of the multicast tree. To put it differently, an IP-splicer which is not located on an edge device may need to source multiple streams to different multicast group addresses.

Figure 3:
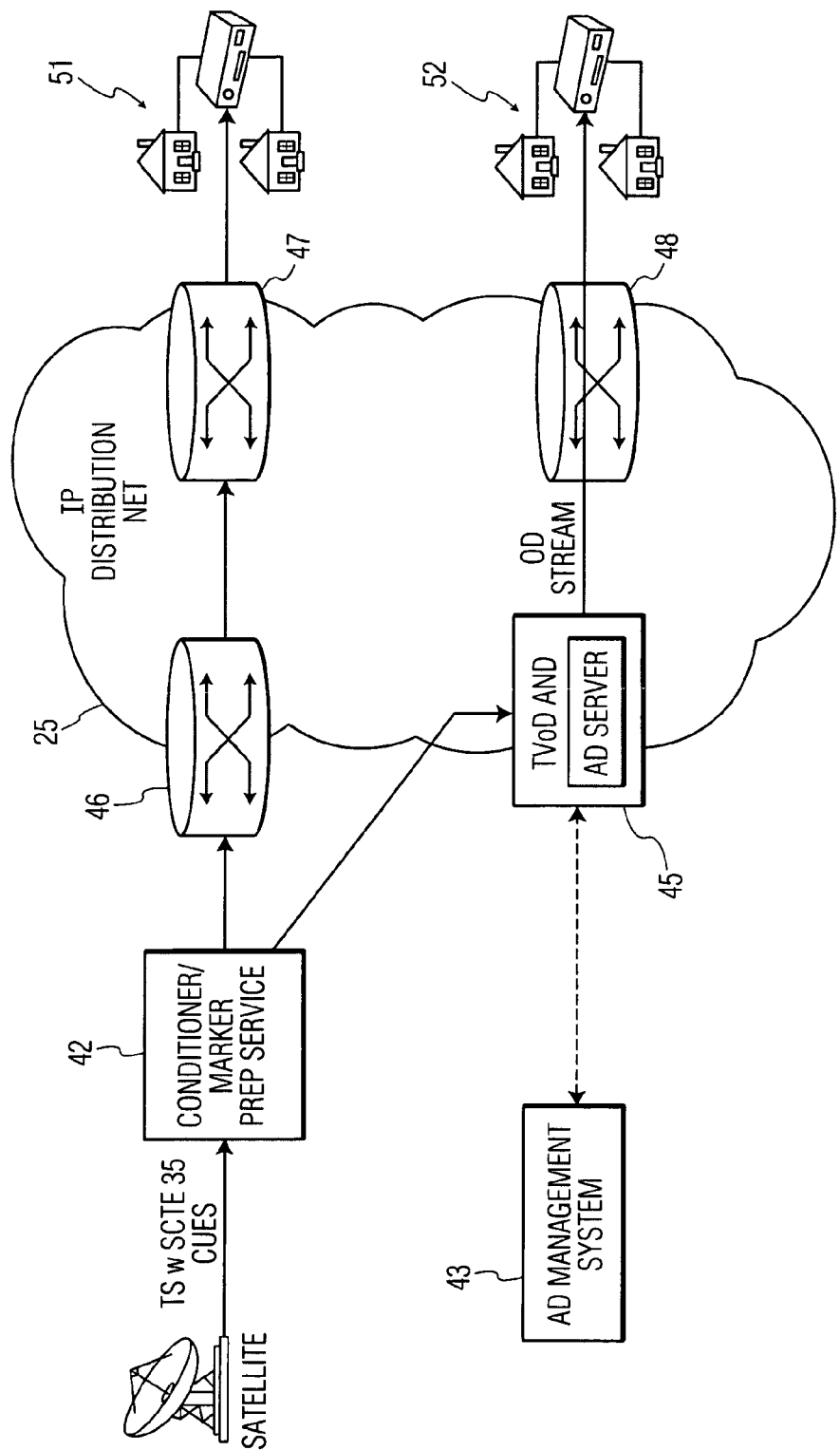
FIG. 3 is a block level diagram of a distributed architecture for targeted ad-insertion.

FIG. 3 shows an alternative embodiment that may be employed for providing targeted or personalized ad insertion into on-demand digital video transport streams for network personal video recording (NPVR) or network digital video recording (NDVR) applications. The system architecture of FIG. 3 is similar to that previously discussed with respect to FIG. 2, with the exception that a television on-demand (TVoD)/ad server unit 45 is shown located on the edge of IP distribution network 25. TVoD/ad server unit 45 ingests video streams output from a conditioner/marker and prep service unit 42, and stores the programs in these streams as video on-demand (VoD) content, which can then be subsequently streamed to the user whenever the user makes an on-demand (OD) selection. In this example, the unicast OD stream output by TVoD/ad server unit 45 is shown being delivered to a targeted user group 52 through PE device 48. Alternatively, the OD stream may be delivered to a single targeted home.

Although FIG. 3 shows the ad server integrated into the TVoD device, it is appreciated that the ad server and TVoD device may be separate units, either co-located or remote located.

Conditioner/marker and prep service unit 42 performs the same basic functions as unit 22 of FIG. 2 to produce a single output stream for targeted ad insertion of live television broadcasts as described previously. That is, unit 42 detects in-stream SIT cue signals that arrive in the original broadcast content received from the satellite feed, and, based on those cue signals, performs elementary and picture level processing, such as closing GOPS, inserting dummy or black frames, ensuring decoder buffer fullness levels are appropriate for splicing, align the picture with the packet boundary, and to create explicit transport stream splice-points. Unit 42 may also remap the video and audio PIDs to a commonly agreed upon set of PIDs. Additionally, conditioner/marker and prep service unit 42 may mark the IP-splice point, using meta-information. Alternatively, marking may be performed using a header field or by inserting a packet with a special splice__info payload type, with the splice_info in the packet payload.

In addition to the basic functions described above, unit 42 prepares the output stream provided to TVoD/ad server unit 45 for storage and subsequent viewing. (The term "program stream" is commonly used to refer to bitstreams that are primarily intended for storage and retrieval from storage media. In the context of the present description, the term "transport stream" may be considered synonymous with the term "program stream".)

In FIG. 3, the conditioned and marked multicast, real-time, broadcast video stream is shown passing through PE devices 46 & 47 for delivery to user group 51. (Note that the splicing and ad server functionality associated with edge device 47 is not shown in FIG. 3.)

The on-demand ad server of unit 45 uses the marked splice information points to insert personalized ads in the OD stream. This may be done in several different ways. According to one method of ad insertion, on-demand server 45 uses the marked splice information to create a template "play-list" with place holders for personalized ads. Upon receiving a setup request from the STB the on-demand server 45 may use the subscriber-ID along with the splice information, such as the program-ID and avail-ID, to query an ad management system 43 to determine the appropriate ads to be inserted. At this point, the on-demand ad server generates a dynamic "play-list" using the template previously created—filling in the ad segments sequentially with selected personalized ads. In other words, a dynamic play-list is generated when a request for the program is made by the user. The video is then streamed using the dynamic play-list, with the targeted ad segments being inserted at the various marked placeholders.

According to a second method for inserting personalized or targeted ads, the on-demand server 45 streams the stored video transport streams in real-time. No play-list is created. Instead, upon detecting the marked splice information trigger points, the on-demand server 45 queries ad management system 43—again, in real-time—to determine the appropriate ads for splicing, using subscriber-ID, program-ID, avail-ID, etc., information. For example, the query may be performed in response to a pre-roll splice_info trigger which happens 5 to 8 seconds prior to the splice time. The prep service of unit 42 could also move the trigger point further back in time if necessary. During streaming, the on-demand server splices (e.g., simple transport stream level or IP stream level splicing) the ad stream at the marked splice_in point. At the marked splice_out point, the on-demand server 45 splices out of the ad stream and returns back to the original unicast stream.

As described above, splice points can be identified via digital SIT cue signals or analog cue tones. In other embodiments, possible splice points may be identified in other ways. For example, possible playout splice points can be identified by parsing event metadata, for example, event metadata that is carried in either a DVB Event Information Table (EIT) or other vendor-specific formats. In an embodiment, artificial event boundaries are identified using one-half hour wall clock boundaries. The event boundaries may correspond to traditional linear program boundaries (e.g., a showing of a sitcom or a showing of a movie), boundaries of operator generated clips (e.g., "How to run the TV remote" or "the new channel lineup"), boundaries of user-generated short content, boundaries of VoD assets, ad boundaries or interstitials.

Within an original media stream (e.g., a media stream that corresponds to the primary content the user desires to view), multiple possible playout splice points may be identified. The playout splice points may be used to insert any secondary media stream, including, for example, advertisement content or non-advertisement content. Regardless of whether a secondary media stream is spliced into the original media stream at any one of the possible playout splice points, the original media stream is conditioned so that splicing can be accomplished at the IP packet level.

MPEG-2 TS media streams include transport stream packets that carry portions of the audio bitstream and transport stream packets that carry portions of the video bitstream. The MPEG-2 TS media streams may also include transport stream packets that carry other information/data, for example, Entitlement Control Messages (ECMs), MPEG private data, and/or MPEG control data. As used herein the "other data" refers to data other than audio or video data. Within the MPEG-2 TS, the flow of audio transport stream packets is temporally offset from the flow of video transport stream packets. Typically, the content in the audio transport stream packets temporally leads the content in the video transport stream packets. One way to deal with the temporal offset between the audio transport stream packets and the video transport stream packets when generating an IP-based splice point is to add "silence" audio information or "black" video information to an IP packet at the IP packet boundary. In an embodiment, the addition of silence and/or black information can be avoided by identifying content-specific splice points, which correspond to a possible playout splice point within the original media stream, for both the audio and video bitstreams. Because of the temporal difference between the audio transport stream packets and the video transport stream packets, the audio bitstream splice point is temporally different from the video bitstream splice point. For example, the audio bitstream splice point temporally leads the video bitstream splice point by an encoder-specific time interval. Once the audio bitstream and video bitstream splice points are identified, the audio bitstream is packetized into audio IP packets with one of the audio IP packets having an IP packet boundary that corresponds to the audio bitstream splice point and the video bitstream is packetized into video IP packets with one of the video IP packets having an IP packet boundary that corresponds to the video bitstream splice point. That is, an audio IP packet is generated to have an IP packet boundary at the audio bitstream splice point and a video IP packet is generated to have an IP packet boundary at the video bitstream splice point. In an embodiment, for the entire duration of the splicing interval, the packet stream consists of IP packets containing nothing but video, IP packets containing nothing but audio, and IP packets containing other types of data. If the other types of data have their own distinct splice points, then the other data can be packetized into content-specific IP packets and spliced at their own content-specific splice point. If the other data is coupled to the video data, the other data can be comingled with the video data and spliced with the video data. Other types of data in the original media stream can be packetized in content-specific IP packets and truncated at content-specific splice points, or comingled with the video or audio bitstream splice points.

The conditioned original media stream, which includes an audio IP packet with a boundary that corresponds to the audio bitstream splice point and a video IP packet with a boundary that corresponds to the video bitstream splice point and may include other content-specific IP packets with corresponding content-specific splice points, is transmitted downstream to a splicer, for example, a splicer that is located at a PE device or a STB. The splicer can insert a secondary media stream at any of the possible playout splice points using IP packet splicing. Because the content-specific splice points are specific to the audio bitstream and the video bitstream, there is no need to add silence or black information to IP packets and IP packet splicing can occur seamlessly without any service interruption or degradation.

Figure 4:
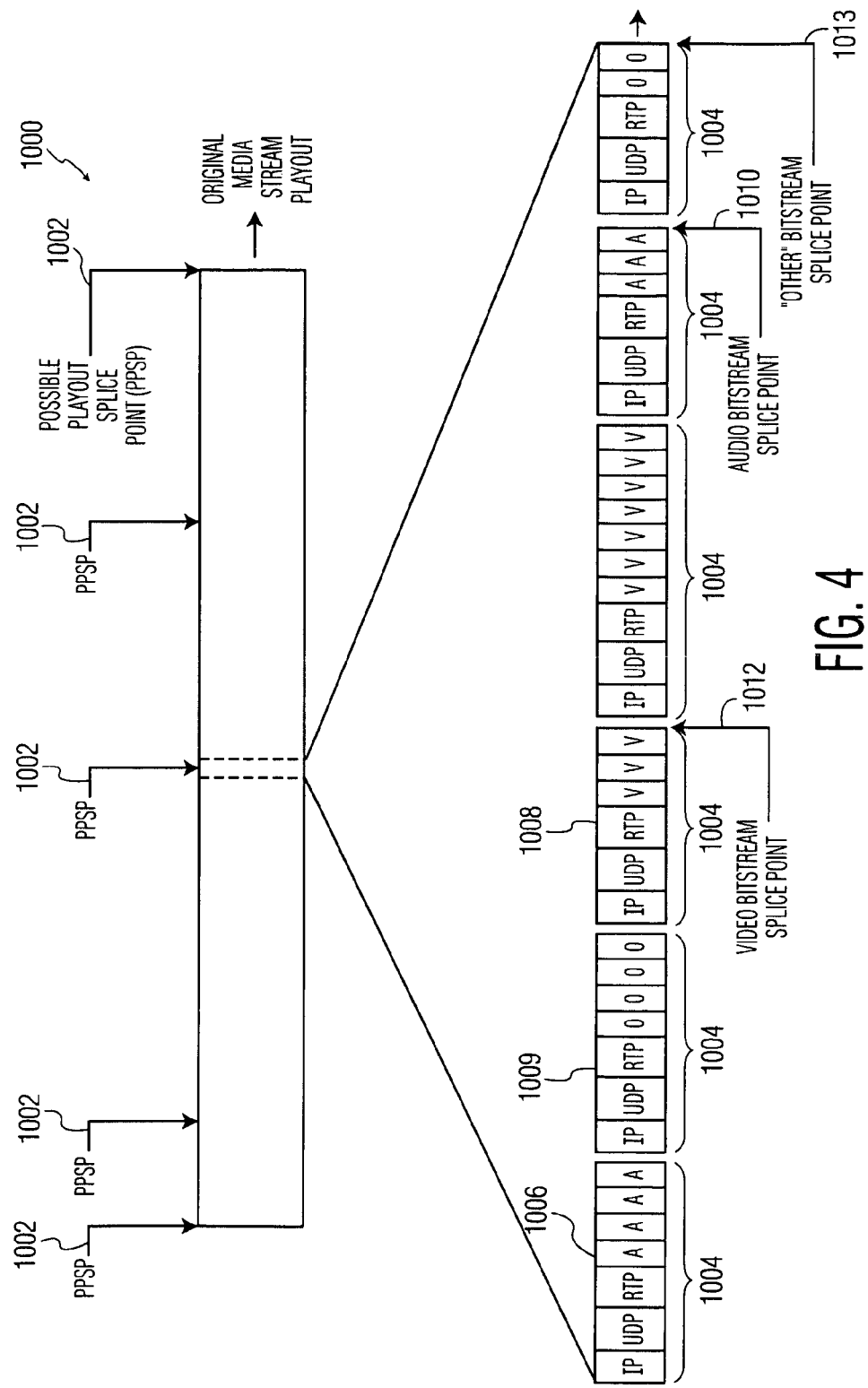
FIG. 4 illustrates an original media stream with multiple possible playout splice points and an expanded view of IP packets near one of the possible playout splice points.

FIG. 4 illustrates an original media stream 1000 with multiple possible playout splice points (PPSPs) 1002 and an expanded view of IP packets 1004 near one of the possible playout splice points. The original media stream is to be played out from the beginning to the end and includes five different possible playout splice points. At each one of the possible playout splice points, the original media stream is conditioned so that a secondary media stream can be inserted at the playout splice point using IP packet splicing. FIG. 4 also depicts an expanded view of the IP packets 1004 that make up a segment of the original media stream near one of the possible playout splice points. As illustrated in the expanded view, the IP packets are separated into content-specific IP packets near the possible playout splice point. For example, near the possible playout splice point, audio IP packets contain only audio transport stream packets 1006 (as indicated by "A"), video IP packets contain only video transport stream packets 1008 (as indicated by "V"), and "other" IP packets contain only other transport stream packets 1009 (as indicated by "O"), such as transport stream packets that contain ECMs, MPEG private data, and/or MPEG control data. Additionally, the content-specific IP packets are sized so that one of the audio IP packets has an IP packet boundary that is at the audio bitstream splice point 1010, so that one of the video IP packets has an IP packet boundary that is at the video bitstream splice point 1012, and so that one of the "other" IP packets has an IP packet boundary that is at the "other" bitstream splice point 1013. In an embodiment, the audio and video IP packets are truncated at the respective content-specific splice point.

In addition to conditioning the original media stream 1000 according to content-specific splice points 1002, references to the content-specific splice points are generated and transmitted to the splicer so that the content-specific splice points can be easily identified. A technique for generating references to points of interest (POIs) such as splice points and for transmitting the references to a POI consumer such as a splicer is described below.

Figure 5:
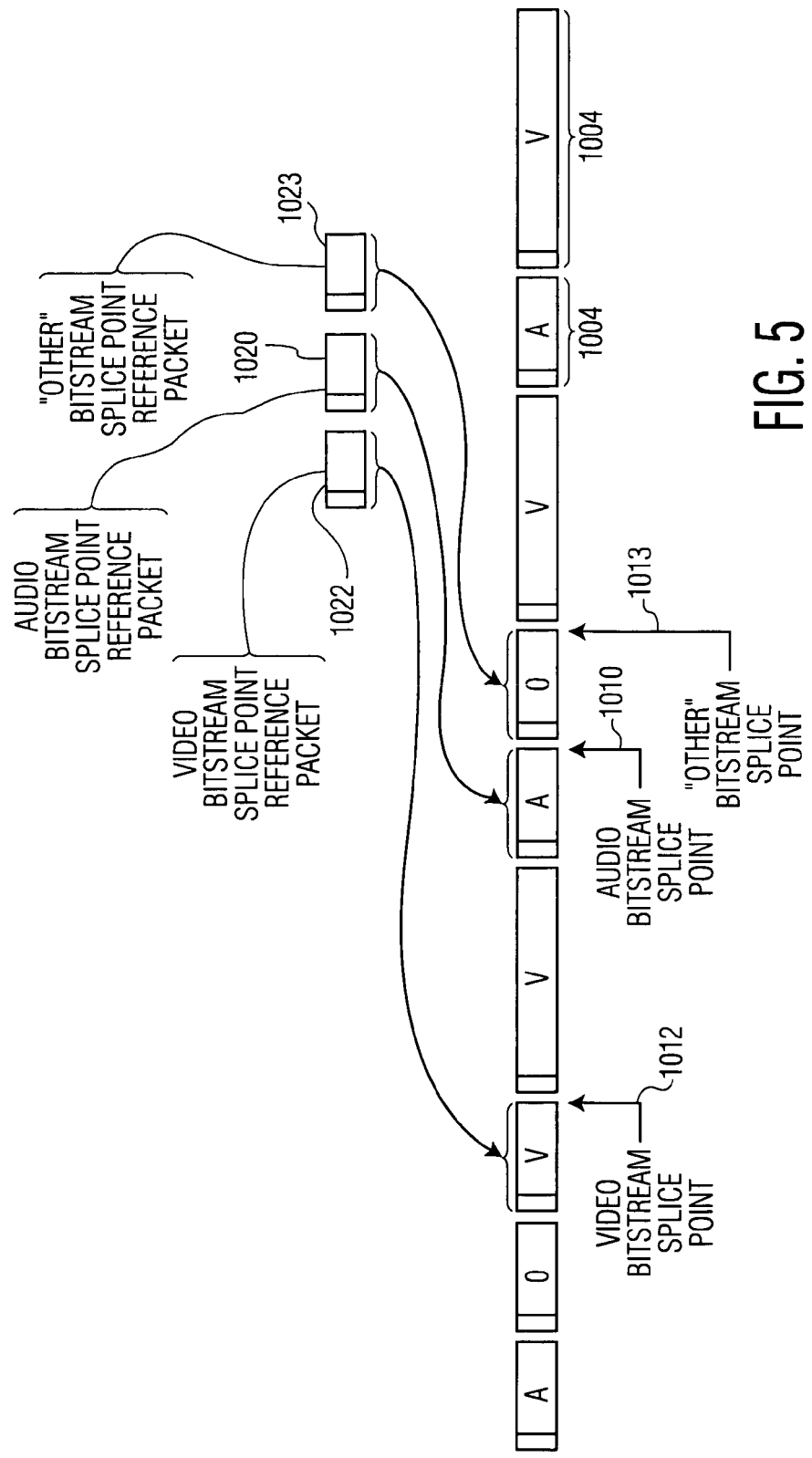
FIG. 5 illustrates two IP packets that carry references to respective audio bitstream and video bitstream splice points.

In the case of possible playout splice points, which have content-specific splice points, references are generated for each content-specific splice point of each possible playout splice point. That is, for each possible playout splice point, a reference is generated for the audio bitstream splice point and a reference is generated for the video bitstream splice point. As described in more detail below, the references may be encapsulated and transmitted in special reference IP packets or in the headers of other downstream packets. FIG. 5 illustrates three IP packets 1020, 1022, and 1023 that carry references to respective audio bitstream, video bitstream, and "other" bitstream splice points. The stream of IP packets illustrated in FIG. 5 includes audio-only IP packets, video-only IP packets, and "other" only IP packets in which at least one of the audio IP packets has a boundary that corresponds to the audio bitstream splice point 1010, at least one of the video IP packets has a boundary that corresponds to the video bitstream splice point 1012, and at least one of the "other" IP packets has a boundary that corresponds to the "other" bitstream splice point 1013. The audio bitstream splice point reference packet identifies the audio packet that is at the audio bitstream splice point and the video bitstream splice point reference packet identifies the video packet that is at the video bitstream splice point. In the example of FIG. 5, the reference IP packets temporally lead the corresponding audio and video IP packets so that the splicer can efficiently perform IP packet splicing.

In an embodiment, lead-in indicators, which count down the time to the possible playout splice points, are generated and transmitted downstream to the splicer. The lead-in indicators allow the splicer to prepare for the splicing operation. In another embodiment, a simple pointer to the SCTE-35 data, or other native "queue tone" format, is included in the reference stream. In another embodiment, pertinent information describing the possible playout splice point is extracted from the MPEG stream and included in the reference stream. In another embodiment, the entire SCTE-35 construct, or other native "queue tone" format, is included in the reference stream.

In an embodiment, if the original media stream is encrypted, Entitlement Control Messages (ECMs) for the original media stream need to be transmitted in time for the decoder to receive the ECMs and to set up the decryptor. It is especially important to transmit the ECMs ahead of time when switching from an unencrypted secondary media stream back to the encrypted original media stream. In an embodiment, the ECMs should also be packetized into content-specific IP packets near the splice points so that the splicer can splice at the correct time.

In an embodiment, if the conditioned original media stream is interlaced. The original media steam ends with a bottom field and the inserted secondary media stream begins with a top field.

Two different techniques are described to accomplish clock recovery at the splicer. In one embodiment, a clock discontinuity is signaled at each splice point. The clock discontinuity signaling allows the splicer to seamlessly playout the audio and video. In another embodiment, the RTP headers point at each Program Clock Reference (PCR)/Presentation Time Stamp (PTS)/Decoding Time Stamp (DTS) reference in the secondary media stream so that the splicer can update the clock values in the secondary media stream.

In an embodiment, the audio and video PIDs of the secondary media stream are set to match the audio and video PIDs of the original media stream. In a true IPTV environment, the design of Single Program Transport Stream (SPTS) flows can make all of the PIDs the same on every service. This allows the splice points to substitute the flows without changing PIDs. In a Multiple Programs Transport Streams (MPTS) environment, the flows cannot all have the same PID values. In the MPTS case, the PIDs of the secondary media stream must be changed at the splice points to match the PIDs of the original media stream.

In an embodiment, a STB tunes to the original media stream and to one of N replacement streams. The original media stream "goes blank" during an advertisement insertion window and then the replacement stream carries the desired advertisement. In an embodiment, the STB would select the replacement stream based on knowledge of the viewer.

In order to facilitate ad/event tracking in the network and STB, a reference to the currently playing event can be included in a "once-per-GOP" reference. When the original media stream is playing, the "event ID" from the metadata is included in the reference steam. When the secondary media stream is playing out, the "once-per-GOP" reference contains the "event ID" for that content. Referencing the secondary media stream enables add fulfillment/verification programs. Note that the reference to the secondary media stream may need to be obscured in order to defeat ad-skipping functionality in some STBs.

Figure 6:
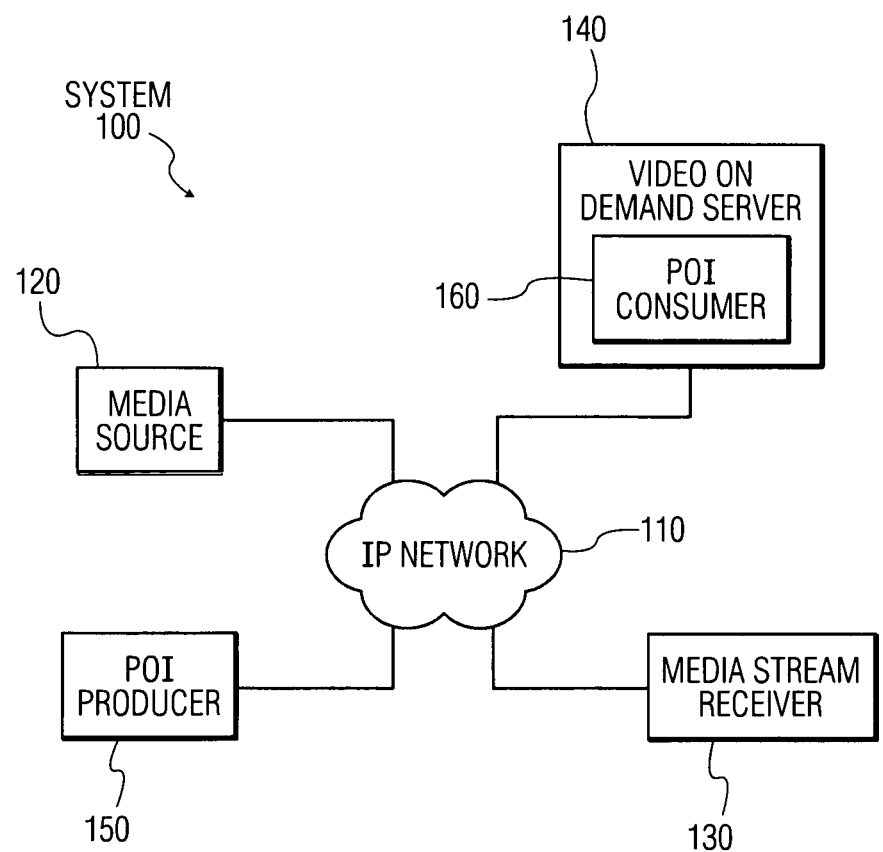
FIG. 6 is a block diagram of an environment in which one embodiment of a system and method for utilizing locating points of interest is located.

A technique for locating POIs using references to media frames within a packet flow is now described with reference to FIGS. 6-13. FIG. 6 is a block diagram of an environment in which one embodiment of a system and method for locating points of interest using references to media frames within a packet flow is located. A system 100 delivers digital multimedia, video and/or television services to subscribers over an Internet Protocol (IP) network 110.

Media source 120 encodes, formats, and transmits a digital media stream. The encoded media stream is then communicated to a media stream receiver 130, which stores, decodes, and/or renders the media stream. Media stream receiver 130 may take the form of (for example) a digital set-top box, a digital video recorder, a home media server, a personal computer, a personal digital assistant, a mobile phone, etc. In this disclosure, the term "media stream" refers to a stream that includes video frames, audio frames, multimedia, or any combination thereof. Common encoding formats for digital media streams include MPEG-2, MPEG-4, H.264, and VC-1. In some environments, the encoded media stream represents a single program, and thus contains a video and an audio stream multiplexed together into a single program transport stream (SPTS).

System 100 also contains one or more components that are downstream of media source 120, and which perform intermediate processing of the encoded media stream. FIG. 6 contains one example of such a component, a video-on-demand (VoD) server 140. VoD server 140 ingests a media stream from media source 120 and plays the stream out at a later time in response to a user request ("on demand"). VoD server 140 also processes the ingested stream to provide "trick mode" capabilities, such as fast-forward, rewind, slow-motion, and pause. Another example of an intermediate processing component is a fast channel change server (not shown), which ingests a media stream from media source 120, and stores, into a cache, a moving "window" through the stream. This cache represents the last few seconds of the stream contents. On request, the fast channel change server plays out a portion ("burst") of the cached window, in order to accelerate the channel change. Without such processing by a fast channel change server, a user typically experiences a delay in displaying the new stream that results from a channel change, during which time the screen might be frozen or blank.

These and other intermediate processing units operate by locating key frames or points of interest (POI) within the encoded stream. Key frames are video frames which can be decoded without reference to another frame. VoD server 140 provides some trick-mode functions by creating a trick mode stream which contains only key frames, or references to such frames. A fast channel change server uses key frames to resynchronize a decoder after a channel change. In addition to key frames, other points of interest in the encoded stream include program-specific information (PSI). Examples of PSI are program map tables (PMTs), program allocation tables (PATs), and entitlement control messages (ECM). PATs and PMTs both provide fundamental structural information about a stream, which a decoder uses to find and process the elements of that stream. ECMs contain keying information that is used to decrypt encrypted content appearing later in the stream. Having these elements explicitly identified as points of interest allows intermediate processing functions to determine which pieces to cache, without having to parse the stream. In addition to the two examples of intermediate processing discussed here (fast channel change and video-on-demand), a person of ordinary skill in the art will be aware of other intermediate processing functions which utilize points of interest, and the principles disclosed herein apply to these as well.

Using features disclosed herein, point-of-interest producer 150 generates references to these points of interest within the media stream, and provides these references to an intermediate component (e.g., a consumer of the points of interest) such as VoD server 140. Point-of-interest consumer 160 uses the references to locate the points of interest within the media stream. An intermediate component associated with point-of-interest consumer 160 uses the points of interest to perform its intermediate function (e.g. produce a trick mode stream). In the example of FIG. 6, this intermediate component is VoD server 140, and point-of-interest consumer 160 resides within VoD server 140. However, a person of ordinary skill in the art should appreciate that, in other embodiments, point-of-interest consumer 160 is separate from, but in communication with, an intermediate function such as VoD server 140.

Point-of-interest producer 150 can use different mechanisms to provide point-of-interest references to point-of-interest consumer 160. FIG. 2A is a block diagram of an embodiment in which media stream 210 is received by a point-of-interest producer 150' and by a point-of-interest consumer 160'. Media stream 210 is a stream 220 of media packets that are either elementary stream packets, or elementary streams encapsulated within transport layer packets 230. The inventive concepts described herein apply to various types of elementary stream encapsulations, including (but not limited to): raw MPEG2 Transport Stream (TS) over legacy transport; MPEG2 Elementary Stream (ES) over UDP/IP, RTP/UDP/IP and RTP/TCP/IP; MPEG2 TS over UDP/IP, RTP/UDP/IP and RTP/TCP/IP.

Point-of-interest producer 150' examines media stream 210 to identify one or more media packets 220 that contain points-of-interest. In the example embodiment of FIG. 7A, POI producer 150' generates a corresponding, but separate, points-of-interest stream 240 that contains references to these "interesting" media packets 220 within media stream 210. Points-of-interest stream 240 is a stream of POI packets 250, where a POI packet 250 contains one or more references to media packets 220, within media stream 210, that were identified as points of interest. (In FIG. 7A, these references are represented symbolically by lines 260. More details about mechanisms for implementing references to media packets 220 will be discussed later in connection with FIG. 8.

Point-of-interest consumer 160' receives points-of-interest stream 240, and also receives the original media stream 210. Point-of-interest consumer 160' uses points-of-interest stream 240 to locate individual points-of-interest (e.g., key frames, program-specific information) within media stream 210. In the example scenario of FIG. 7A, four media packets (220A-D) are identified as points-of-interest, and thus points-of-interest stream 240 contains four POI references (260A-D). Once the points-of-interest are located, an intermediate processing function (not shown) uses the points-of-interest in a manner appropriate to its function.

Figure 7A:
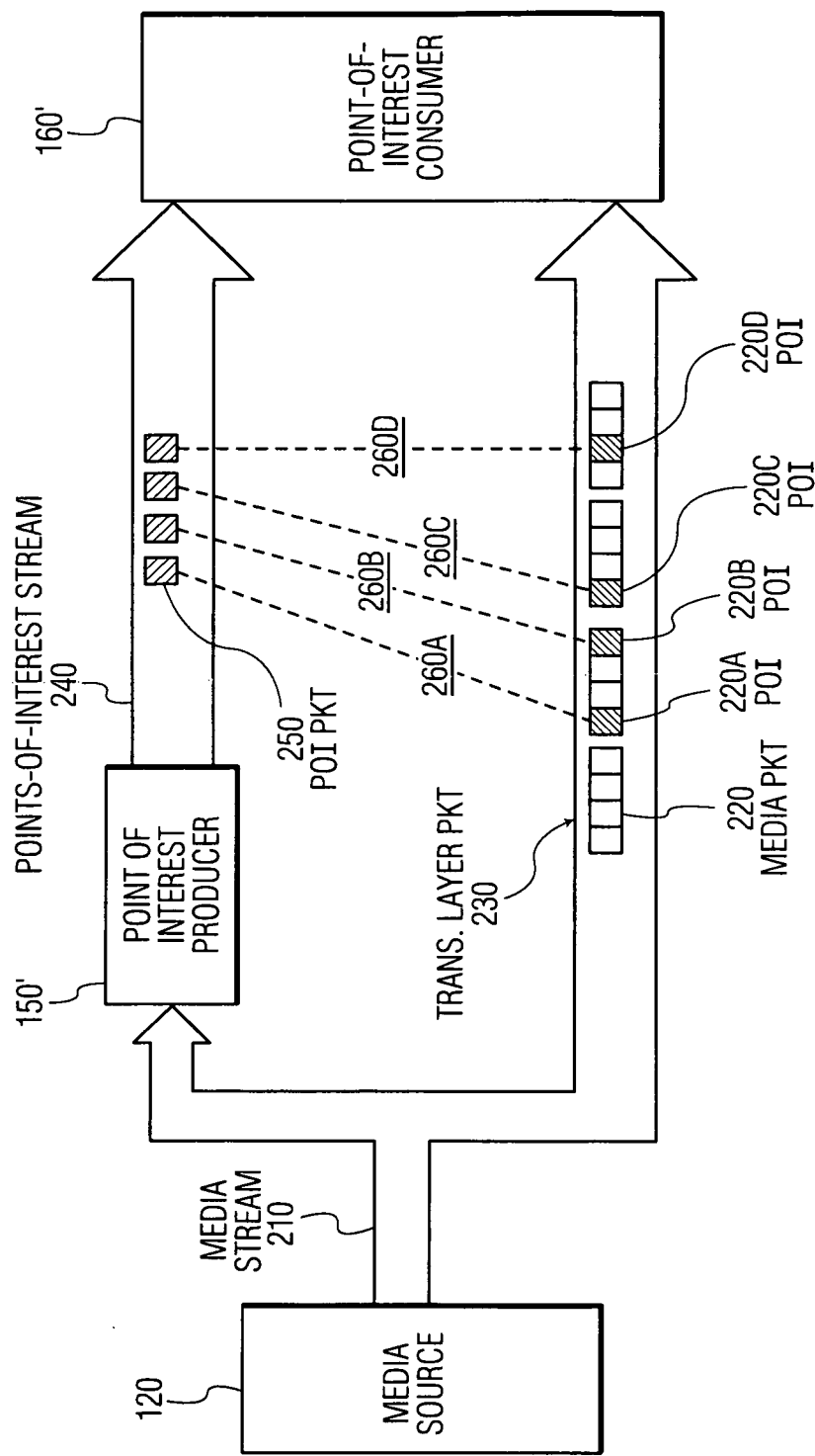
FIG. 7A is a block diagram of an embodiment in which a media stream is received by a point-of-interest producer and by a point-of-interest consumer.
Figure 7B:
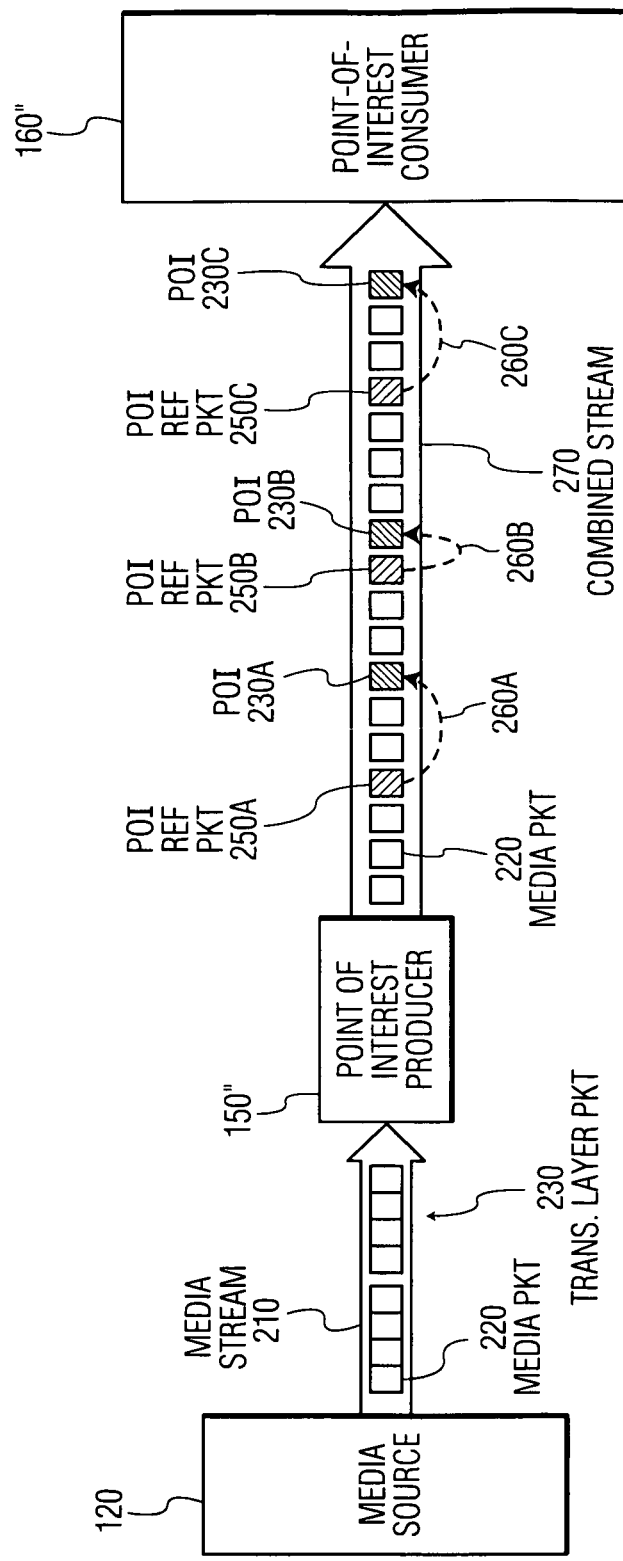
FIG. 7B is a block diagram of another embodiment in which a point-of-interest producer parses a media stream to locate points-of-interest, and produces a combined stream.

FIG. 7B is a block diagram of an alternative embodiment in which point-of-interest producer 150" parses media stream 210 to locate points-of-interest, and produces a combined stream 270. Combined stream 270 contains transport layer packets (not shown) from media stream 210, where transport layer packets contain media packets 220. Combined stream 270 also contains POI packets 250 that refer to those media packets 220 within media stream 210 that are identified as points-of-interest. Point-of-interest consumer 160" examines combined stream 270, and uses the references within POI packets 250 to locate point-of-interest payloads in combined stream 270. In the example scenario of FIG. 7B, three media packets (230A-C) are identified as points-of-interest, and thus points-of-interest stream 240 contains three POI references packets 250A-C, each containing a reference 260A-C to a POI packet 230A-C. Once the points-of-interest are located, an intermediate processing function (not shown) uses the points-of-interest in a manner appropriate to its function. In yet another embodiment (not shown), the functionality of point-of-interest producer 150 is integrated with media source 120. In other words, media source 120 generates references to points-of-interest within the media stream as the media stream itself is generated.

Figure 7C:
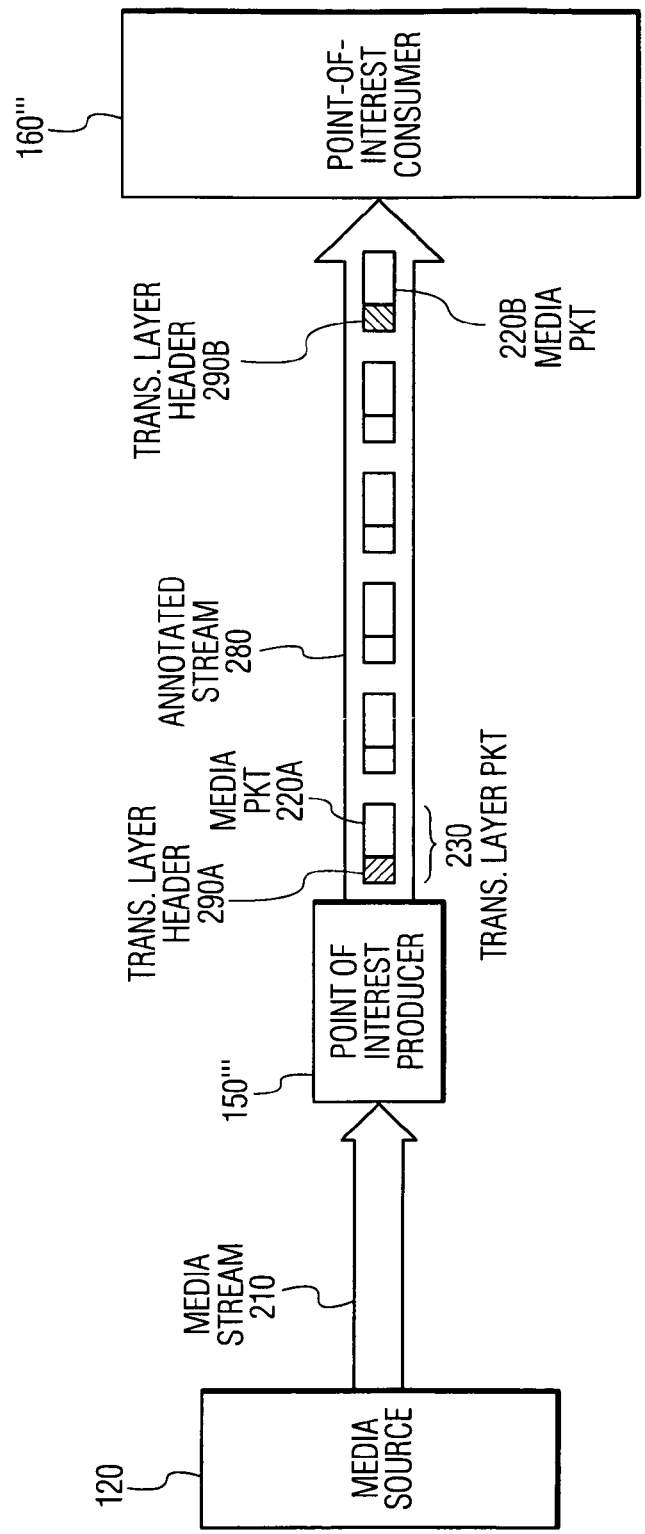
FIG. 7C is a block diagram of yet another embodiment in which a point-of-interest producer parses a media stream to locate points-of-interest, and produces a new stream, which is an annotated version of the original media stream.

FIG. 7C is a block diagram of another alternative embodiment in which point-of-interest producer 150 parses media stream 210 to locate points-of-interest, and produces a new stream 280, which is an annotated version of original media stream 210. Annotated stream 280 contains transport layer packets 230 from media stream 210, where transport layer packets 230 contain media packets 220. Information carried in headers 290 on the transport layer packets 230 identifies whether or not the media packets 220 contained within are points-of-interest, and if so, provides further information about the point-of-interest. Point-of-interest consumer 160''' examines annotated stream 280, and uses the annotations within the transport layer headers 290 to determine which media payloads in annotated stream 280 are points-of-interest. In the example scenario of FIG. 7C, two media packets (220A, B) are identified as points-of-interest by information in their respective transport layer headers 290A, 290B.

In some embodiments, RTP is used as the transport layer protocol, and the point-of-interest information is conveyed in the RTP header using RTP header extensions. The RTP header extension is formed as a sequence of extension elements, with possible padding. Each extension element has a local identifier and a length. Further details on RTP header extensions can be found in Internet draft-ietf-avt-rtp-hdrext-12.txt ("A general mechanism for RTP Header Extensions"). Examples of local identifiers in this context include point-of-interest classifier, SMPTE time code information, or MPEG stream hints that can be used for decoder optimization, trick play state generation, etc.

The concept of a frame or PSI as being a "point-of-interest" should be familiar to a person of ordinary skill in the art, as will various mechanisms used to select "points of interest". Commonly used selection criteria include selecting the start of all I-frames, all PSIs, all ECMs, or various combinations of these criteria. In one embodiment, selection criteria involves selecting anchor frames. In this disclosure, an anchor frame is an I-frame, instantaneous decoder refresh frame (IDR-frame), or a frame that depends only on a past single reference frame that is the most-recently decoded anchor frame.

As described above in connection with FIGS. 7A-C, the same technique for identifying and encoding the POI information described herein can be used in many different ways: the POI information can be included in the steam as originated (e.g. included by the encoder); the media stream can be processed to produce a new stream of the same or a different protocol with POI annotations; or a separate POI annotation stream can be produced, leaving the original stream untouched. Having described in general the relationship between media stream 210 and the other streams (210, 220, 270, 280) the syntax and encoding of points-of-interest information will now be described in more detail in connection with the diagrams of FIGS. 8A-C.

Figure 8B:
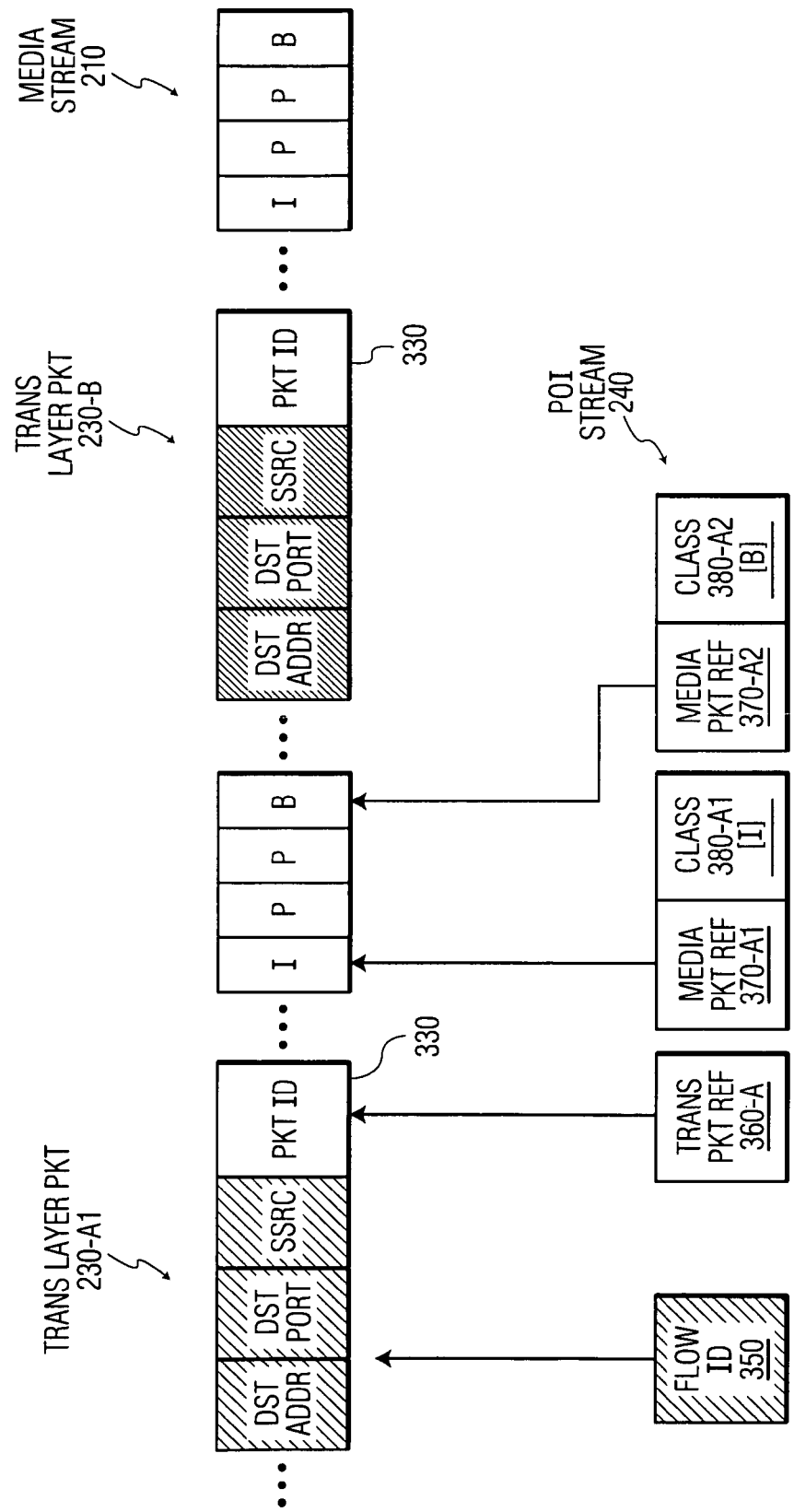
Figure 8C:
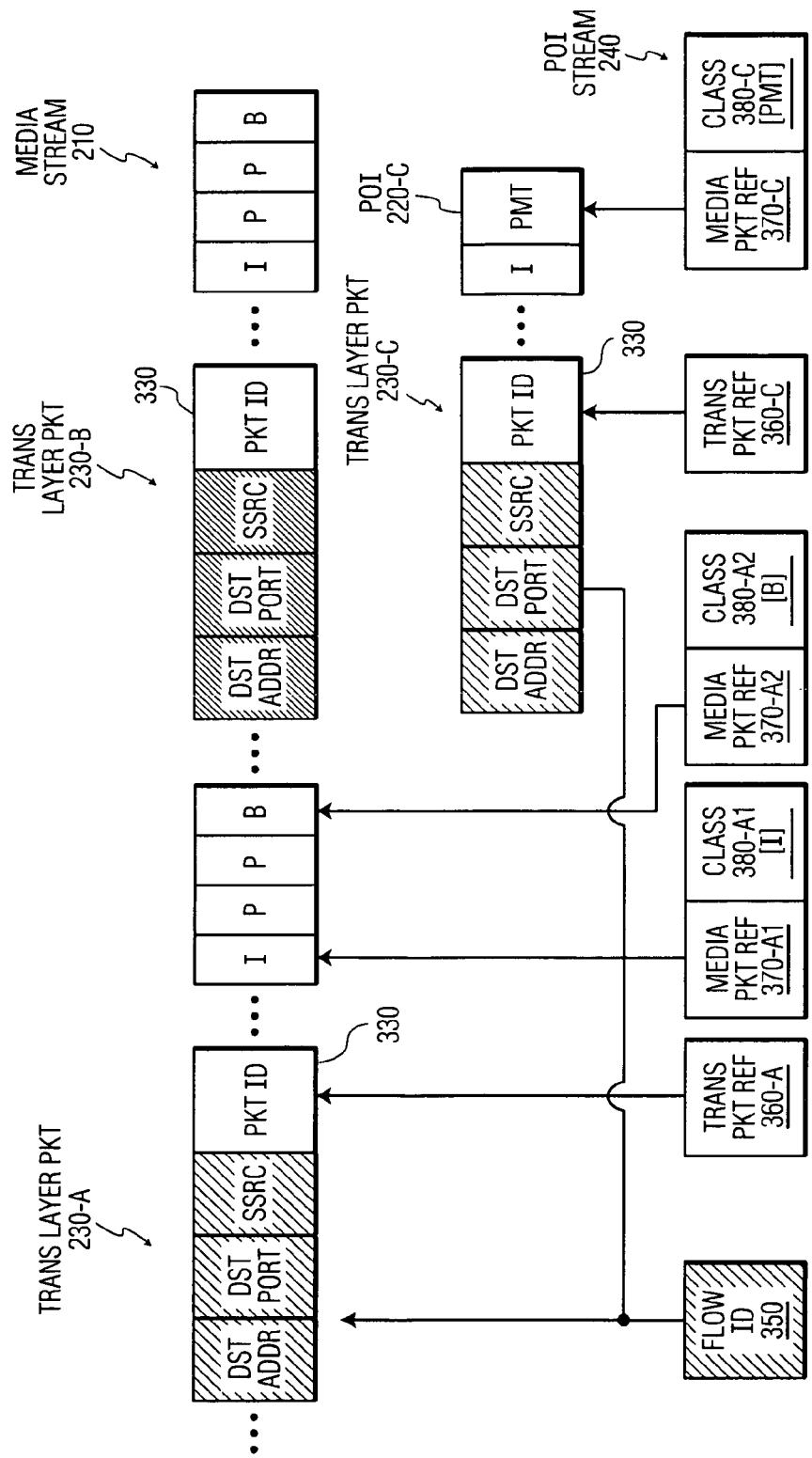

As can be seen in FIGS. 8A-C, media stream 210 is formatted as a stream of application-layer packets, referred to earlier as media packets 220. A media packet 220 encapsulates items such as a video frame, PSI, audio segments, etc. In some embodiments, these items can be split across media packets 220, so that one media packet 220 contains only a portion of a video frame, PSI, or audio segment.

Media packets 220 are encapsulated within transport layer packets 230, where each transport layer packet 230 includes a transport layer header 230H and a transport layer payload 230P. Transport layer packets 230 are in turn encapsulated by additional protocol layers, shown here as an additional header 310. In the embodiments described herein, Internet Protocol (IP) is used as the network layer and Real-time Transport Protocol (RTP) in combination with User Datagram Protocol (UDP) is used as the transport layer, with the media packets multiplexed into an MPEG2 Transport Stream. A person of ordinary skill in the art should be familiar with MPEG2 transport, IP, UDP and RTP packet formats, so headers and payloads have been simplified in FIGS. 8A-C.

As described earlier, point-of-interest producer 150 locates key frame media packets and program-specific information (PSI) media packets, and generates a reference to each of these points of interest. The first level reference to a particular media packet 220 identifies the containing transport layer packet 230. A particular transport layer packet 230 is identified by a flow identifier 320 and a flow-unique packet identifier 330. A person of ordinary skill in the art should be familiar with the concept of a packet flow, which consists of a series of packets between two endpoints, where the two endpoints are identified by information contained in each packet header. An RTP flow is defined by a destination address and a destination port (both part of IP/UDP header 310), and a synchronization source identifier (SSRC, part of transport layer header 230H). Thus, the combination of destination address, destination port, and SSRC serves as a flow identifier 320 for an RTP flow. In the case of RTP, the packet identifier 330 is a sequence number 330.

In the example scenario shown in FIG. 8A, point-of-interest producer 150 processes transport layer packet 230-A, and identifies two points of interest, namely, 220-A1 and 220-A2. References to these two points-of-interest are then added to points-of-interest stream 240 (shown in FIGS. 7A-C). Since both points of interest are located in the same transport layer packet (230-A), the first reference begins with a flow reference 350 and a transport packet reference 360, which together identify a particular transport layer packet (here, 230-A). In FIG. 8, flow reference 350 "points" to the flow identifier fields of transport layer packet 230-A, but a person of ordinary skill in the art should appreciate that this implies that flow reference 350 has the same values as the flow fields (destination address, destination port, SSRC) in transport layer packet 230-A. Similarly, transport packet reference 360-A "points" to the packet identifier field 330 of transport layer packet 230-A, which implies that transport packet reference 360-A is set to the same value as the packet identifier field 330.

Since a transport layer packet can carry multiple media packets, the reference to media packet 220-A1 continues with a media packet reference 370-A1. In FIG. 8A, media packet reference 370-A1 "points" to media packet 220-A1 as the first media packet within the transport layer packet 230. A person of ordinary skill in the art should appreciate that the symbolic representation used here (arrows between packet fields) can be implemented by setting media packet reference 370 to any value that specifies one packet in the sequence of media packets conveyed in transport layer packet 230. For example, media packet reference 370 can be a media packet number (e.g., first, second, etc.) or a byte offset (e.g., 0, 1× media packet size, etc.). In this example embodiment, the reference to media packet 220-A1 concludes with a point-of-interest classifier 380-A1 or type, further describing the point-of-interest. For example, a classifier 380 can describe a key frame, a particular type of key frame (e.g. I-frame), a PSI, or a particular type of PSI.

Point-of-interest producer 150 then adds a second reference to points-of-interest stream 240, the reference to point-of-interest 220-A2. Since this point-of-interest is contained in the same transport layer packet (230-A), it is unnecessary to repeat the flow reference (350) and the transport reference (360-A). The second point-of-interest (220-A2) is simply identified as the last media packet (370-A2) in transport layer packet 230-A.

FIG. 8B continues the example scenario. At this time, point-of-interest producer 150 processes a second transport layer packet 230-B, but finds no points of interest within transport layer packet 230-B. Therefore, no new references are added to points-of-interest stream 240.

FIG. 8C completes the example scenario. At this time, point-of-interest producer 150 processes a third transport layer packet 230-C, and finds one point-of-interest. Transport layer packet 230-C belongs to the same flow as the other two transport packets. Therefore, it is unnecessary to repeat the flow reference (350). The third point-of-interest (220-C) is identified by a new transport reference (360-C) and a new media packet reference (370-C).

The embodiment of FIGS. 8A-8C uses a combination of RTP and UDP as a transport layer. Another embodiment that uses UDP without RTP is now described in connection with FIG. 9. Media packets 220 are encapsulated within UDP packets 410, where each UDP packet 410 includes a UDP header 410H and a UDP payload 410P. UDP packet 410 is in turn encapsulated by additional protocol layers, shown here as an additional IP header 420. A particular UDP packet 410 belongs to a flow 430, identified by source IP address, destination IP address, protocol identifier (UDP), source UDP port, and destination UDP port.

Figure 9:
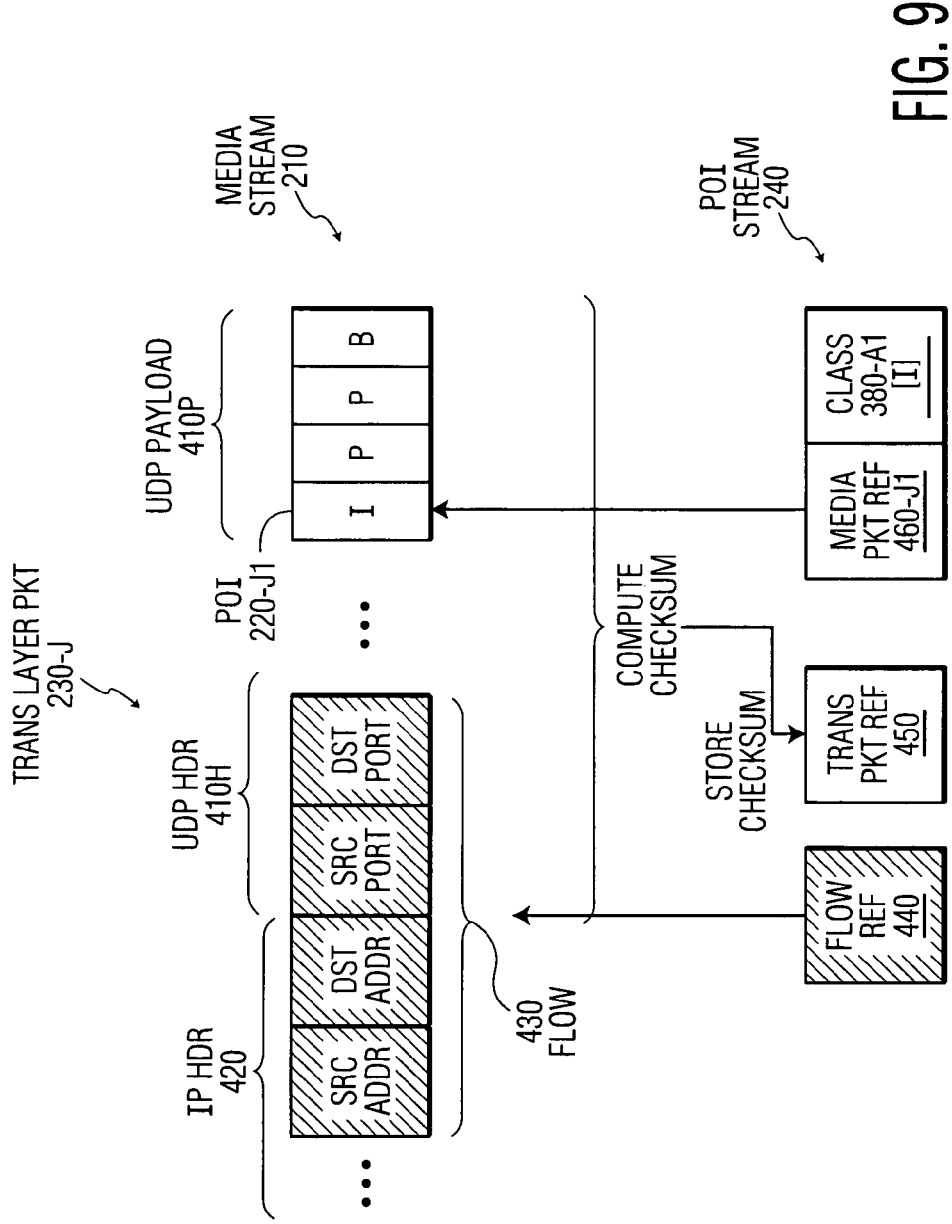
FIG. 9 is a block diagram showing how syntax and encoding of points-of-interest information is performed in another embodiment of a system and method for utilizing locating points of interest.

In the example scenario shown in FIG. 9, point-of-interest producer 150 processes transport layer packet 230-J, and identifies one point-of-interest, namely 220-J1. References to this point-of-interest are then added to points-of-interest stream 240. The first reference begins with a flow reference 440 that partially identifies transport layer packet 230-J. In FIGS. 8A-8C, flow reference 350 "points" to the flow identifier fields of transport layer packet 230-J, but a person of ordinary skill in the art should appreciate that this implies that flow reference 350 has the same values as the flow fields (source and destination address, source and destination port) in transport layer packet 230-J.

The partial identification of transport layer packet 230-J is completed by transport packet reference 450. In the embodiment described above, RTP sequence numbers are used as transport packet references. However, UDP does not use sequence numbers, and there is nothing that is conveyed in the UDP packet itself which uniquely distinguishes one UDP packet from another. The embodiment of FIG. 9 uses a technique whereby UDP packets are identified by a checksum. This checksum is computed by point-of-interest producer 150 and used as transport packet reference 450 within points-of-interest stream 240. Point-of-interest consumer 160 then computes a checksum on incoming packets, and uses this computed checksum as a transport packet identifier. In this manner, point-of-interest consumer 160 is able to distinguish among UDP packets belonging to the same flow, even though the packets themselves do not carry a unique identifier. In these embodiments, the checksum can be computed over any combination of the UDP header and UDP payload (which encapsulates an MPEG Transport Packet). In one example, the identifier is a checksum for UDP packet 410.

The embodiment of FIG. 9 uses a media packet reference 460 to specify a particular media packet 220 within transport layer packet 230-J. Media packet reference 460 is similar to the one described above for the UDP+RTP embodiment of FIGS. 8A-C, specifying either a packet number offset or a byte offset within the UDP payload 410P. This embodiment can also use a point-of-interest classifier 380 or type, further describing the point-of-interest (e.g., key frame, I-frame, B-frame, P-frame, PSI, PMT, PAT, ECM, splice point, etc.)

Figure 10:
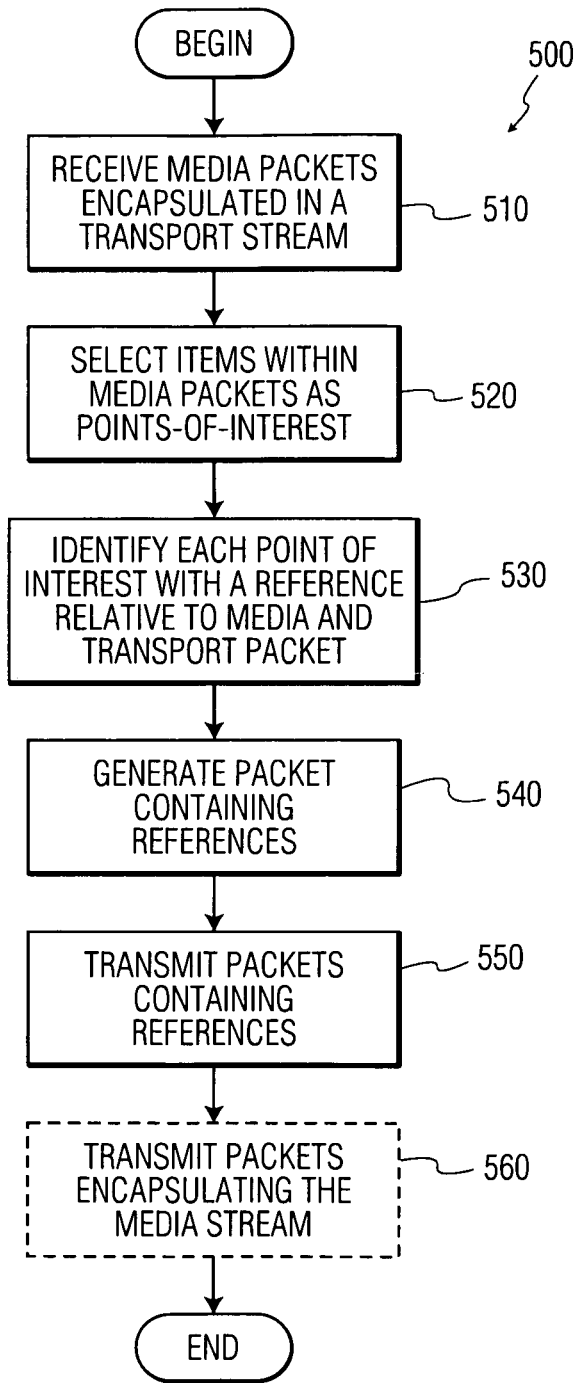
FIG. 10 is a flowchart of a process implemented by one embodiment of the point-of-interest producer from FIG. 6.

FIG. 10 is a flowchart of a process implemented by one embodiment of point-of-interest producer 150. The process 500 begins at block 510, where a stream of media packets encapsulated in a transport stream is received. Next, at block 520, the media packets are examined, and one or more frames or PSIs in the media packets are determined to be points of interest. The concept of a "point-of-interest" in a media stream should be known to a person of ordinary skill in the art, as should be various mechanisms for determining which frames or PSIs are points of interest. A few simple examples of selection criteria are selecting I-frames, selecting anchor frames (where anchor frames are described above), selecting PMTs, selecting PATs, and selecting ECMs, as well as combinations of these criteria.

Processing continues at block 530, where each point-of-interest is identified with a reference to a containing transport packet, and media packet within the transport packet. As described above, in one embodiment the reference is a combination that identifies the flow, the particular transport packet within the flow, and the particular media packet within the transport packet. In some embodiments, the reference also includes a description of the point-of-interest, such as frame or PSI, type of frame (I, B, P, etc.) and type of PSI (PMT, PAT, etc.).

Next, at block 540, a packet or series of packets that contain the references to points-of-interest are generated. As described above (in connection with FIG. 7C), some embodiments modify the transport layer headers of the original media packets to include point-of-interest information (such as a point-of-interest classifier), while other embodiments (described above in connection with FIG. 7B) generate reference packets or "point-of-interest" packets which are separate and distinct from media packets. A person of ordinary skill in the art should realize that when separate media and reference packets are used, the protocol used to carry the references is not required to be the same as the protocol that encapsulates the media packets (although the same protocol can be used). For example, one embodiment uses UDP to encapsulate MPEG-2 transport packets, but RTP to encapsulate the points-of-interest stream.

Processing continues at block 550, where the stream of packets containing the references to points-of-interest is transmitted to a receiver containing point-of-interest consumer 160 (FIG. 6). At block 560, which is optional, the packets containing the multimedia flow (received at block 510) are transmitted to the same receiver. These data flows may be in real time, or may be done in a non-real-time mode.

Figure 11:
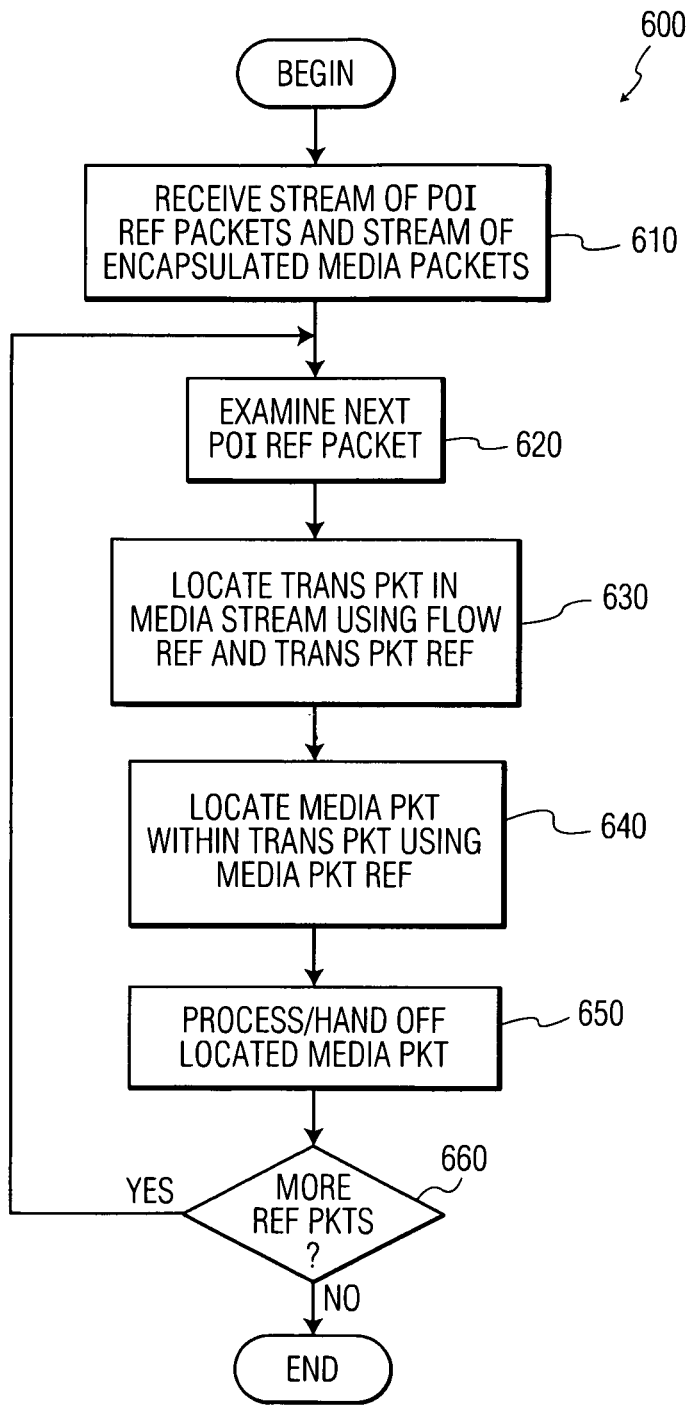
FIG. 11 is a flowchart of a process implemented by one embodiment of the point-of-interest consumer from FIG. 6.

FIG. 11 is a flowchart of a process implemented by one embodiment of point-of-interest consumer 160. The process 600 begins at block 610, where a stream of media packets encapsulated in a transport stream, and a stream of corresponding point-of-interest reference packets is received. At block 620, the next point-of-interest reference packet is examined. Block 630 uses the information within to locate the appropriate transport packet in the received media stream. In this example embodiment, the flow reference and transport packet reference fields within the reference packet are used to find a transport packet in the media stream having a matching flow identifier and sequence identifier.

Processing continues at block 640, where additional information within the current point-of-interest reference packet is used to locate the appropriate media packet within the already-identified (at block 630) transport packet. In this example embodiment, the media packet reference field within the reference packet is used to find the appropriate media packet within the series (e.g., the first, second, etc.).

Next, at block 650, the media packet found at block 640 is processed by some intermediate processing function, or is handed off by such an intermediate processing functions. The role of intermediate processing functions (such as trick mode stream generation in video-on-demand servers and locating key frames in fast channel change servers) is discussed above, and should be familiar to a person of ordinary skill in the art.

Block 660 determines whether any reference packets remain to be processed. If Yes, then processing starts for the next reference packet, at block 620. If No, process 600 is complete.

Figure 12A:
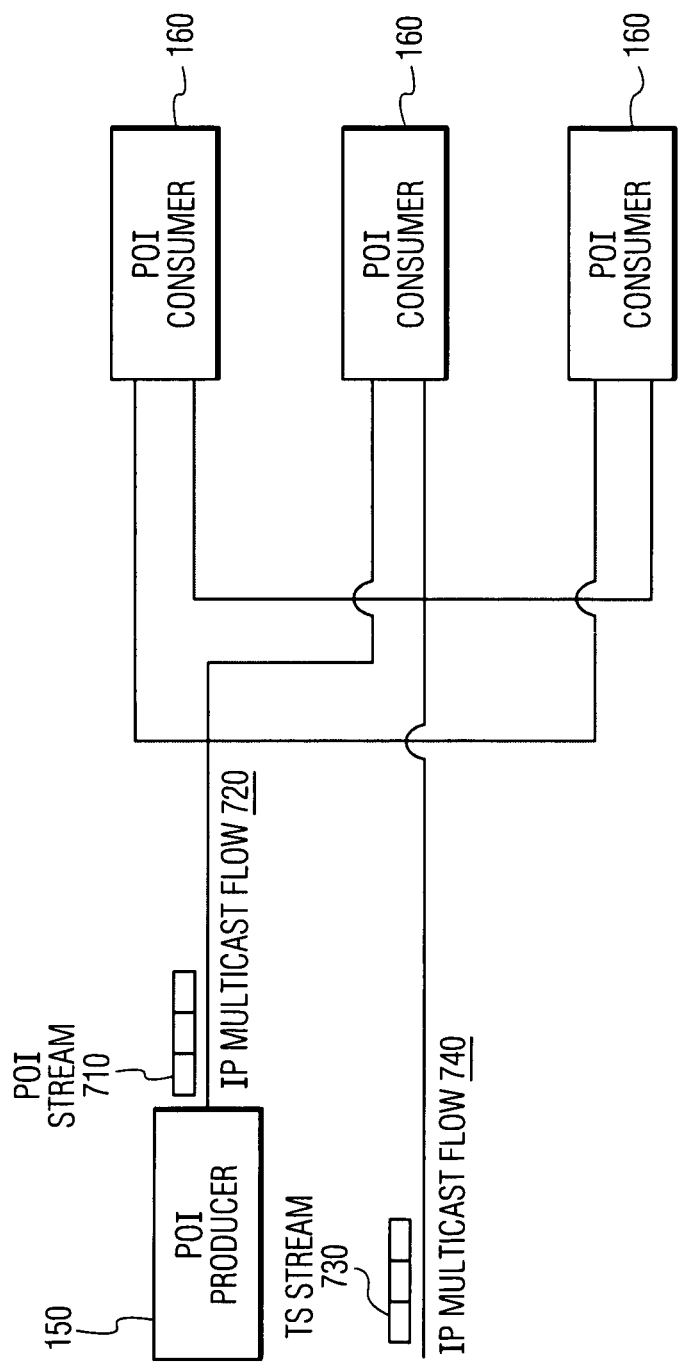
FIGS. 12A and 12B are block diagrams of various embodiments of point-of-interest producer 150 and point-of-interest consumer 160.

FIG. 12A is a block diagram of an embodiment of point-of-interest producer 150 and point-of-interest consumer 160, in which IP multicast is used to deliver both the primary media stream and the points-of-interest stream. Point-of-interest producer 150 produces one points-of-interest stream 710, and transmits this points-of-interest stream 710 to several instances of point-of-interest consumer 160 using a IP multicast flow 720. As explained above, points-of-interest stream 710 is associated with (and generated from) a multimedia transport stream 730. In this example, transport stream 730 is transmitted on a separate IP multicast flow 740. This example also illustrates that transport stream 730 is transmitted by an entity other than point-of-interest producer 150. Other embodiments are contemplated in which point-of-interest producer 150 transmits both streams.

Figure 12B:
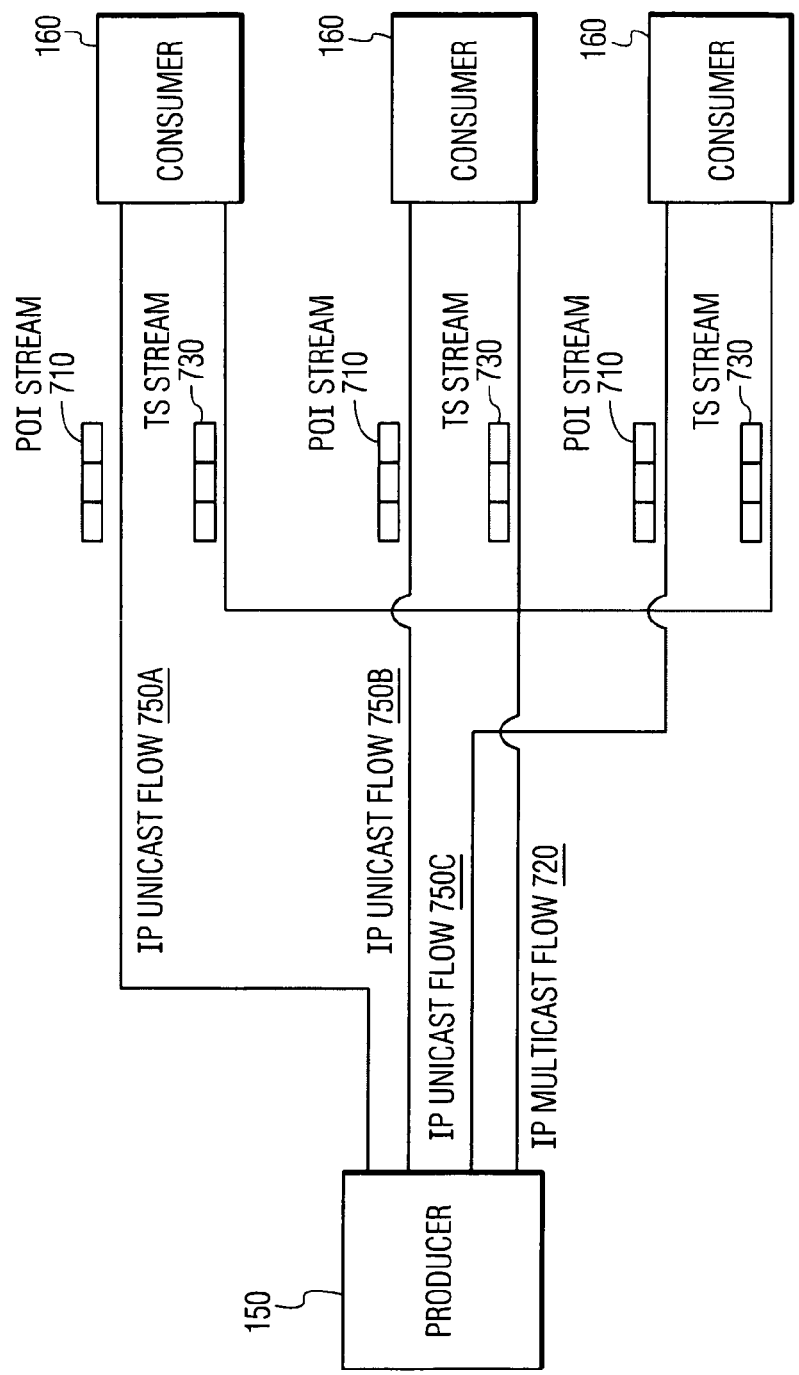

FIG. 12B is a block diagram of another embodiment of point-of-interest producer 150 and point-of-interest consumer 160, in which IP multicast is used to deliver the primary media stream and IP unicast is used to deliver the points-of-interest stream. Point-of-interest producer 150 produces one points-of-interest stream 710, and transmits this points-of-interest stream 710 to several instances of point-of-interest consumer 160, using a separate IP unicast flow 750A-C for delivery to each point-of-interest consumer 160. A single IP multicast flow 720 is used to transmit the multimedia transport stream 730 that is associated with the points-of-interest stream 710.

Several other flow variations (not shown) are contemplated. In one, each receiver receives the primary media stream and the points-of-interest stream on a single IP unicast address. The two streams are differentiated by UDP port number. In another variation, different IP multicast addresses are used to deliver points-of-interest stream 710 to different receivers. In yet another variation, the points-of-interest stream is delivered to multiple receivers using the same multicast IP address, but different UDP ports. In still another variation, the points-of-interest stream is delivered to different receivers on a single multicast IP address and a single UDP port, but distinguished by different PIDs.

Figure 13:
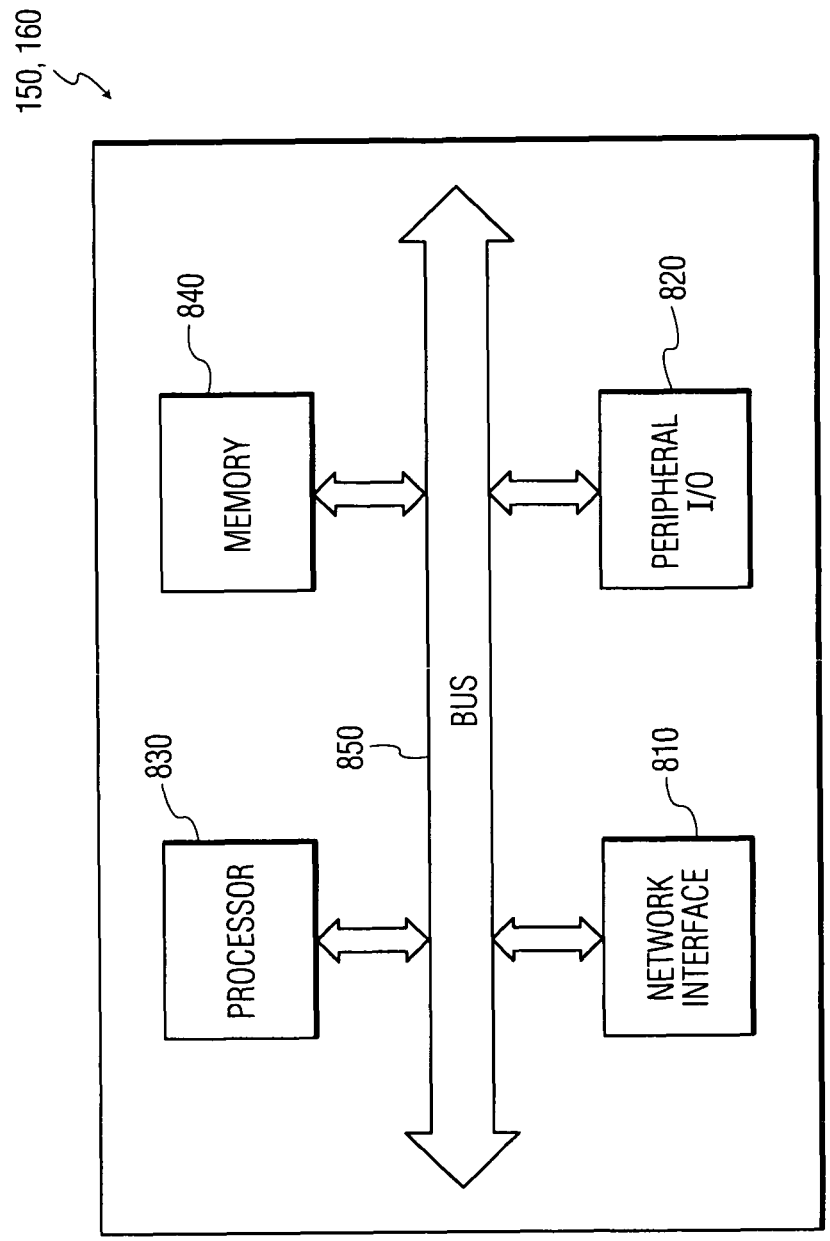
FIG. 13 is a block diagram showing selected components of the point-of-interest consumer or producer from FIG. 6.

FIG. 13 is a block diagram showing selected components of a point-of-interest consumer 160 or producer 150 which implements at least one of the systems and methods disclosed herein. Consumer 160 or producer 150 comprises: a network interface 810; a peripheral IO interface 820; a processor 830; and memory 840. These components are coupled by a bus 850.

Memory 840 contains instructions that are executed by processor 830 to control operations of consumer 160 or producer 150. Peripheral I/O interface 820 provides input and output signals, for example, user inputs from a remote control or front panel buttons or a keyboard, and outputs such as LEDs or LCD on the front panel. Network interface 810 transmits/receives points-of-interest stream 240, media stream 210, and/or combined stream 270 (depending on the configuration). In some embodiments, network interface 810 is for a local area network (LAN) or a wide area network (WAN) such as the Internet. In other embodiments, this interface is for a radio frequency (RF) network, and so may include a tuner/demodulator (not shown) which processes the digital signals received over the RF network.

Omitted from FIG. 13 are a number of conventional components, known to those skilled in the art, that are unnecessary to explain the operation of the systems and methods disclosed herein. A person of ordinary skill in the art should understand that software components referred to herein includes executable code that is packaged, for example, as a standalone executable file, a library, a shared library, a loadable module, a driver, or an assembly, as well as interpreted code that is packaged, for example, as a class.

Figure 14:
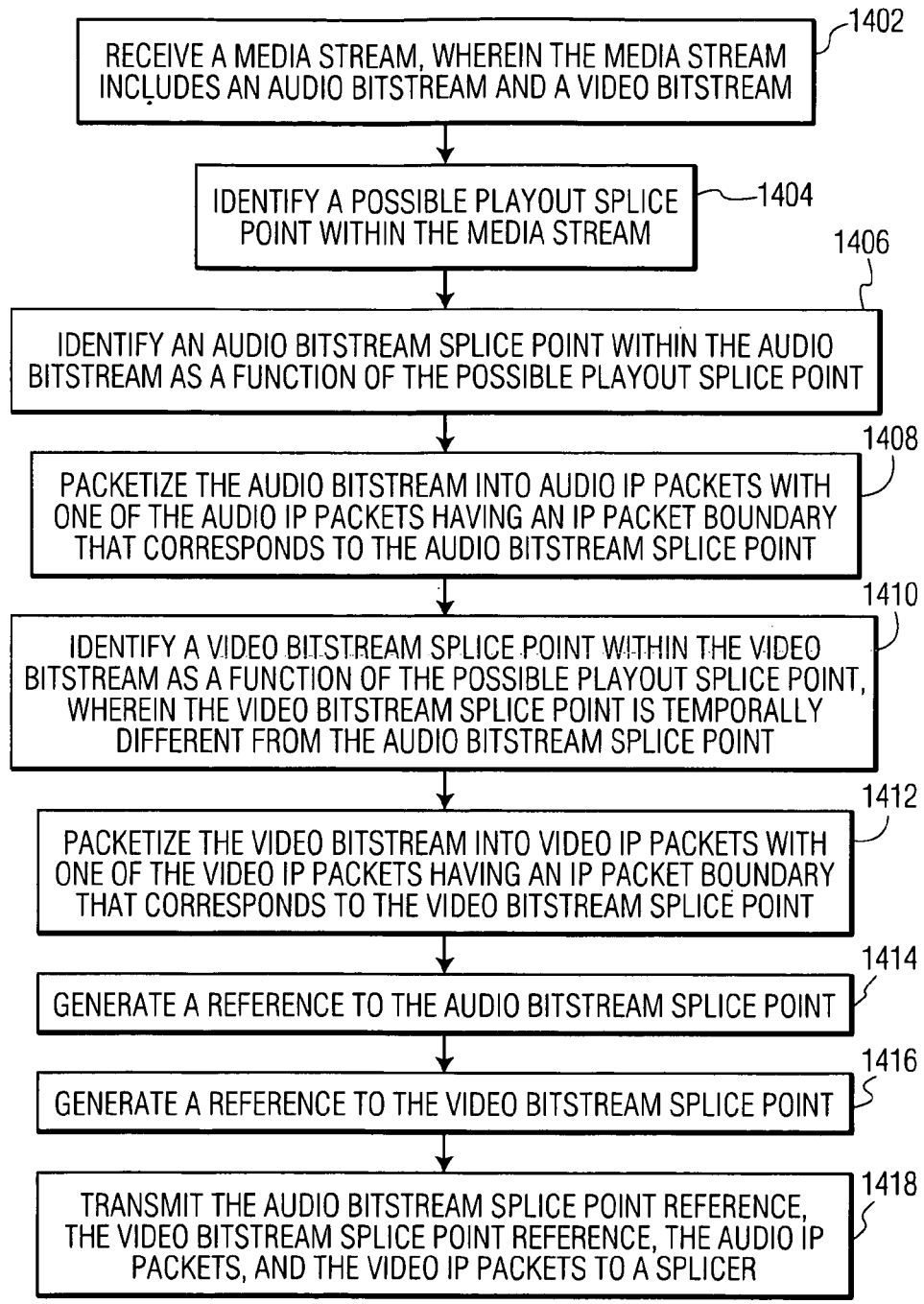
FIG. 14 is a block diagram of a method for conditioning a media stream for splicing using content-specific splice points.

FIG. 14 is a block diagram of a method for conditioning a media stream for splicing using content-specific splice points. At block 1402, a media stream is received, wherein the media stream includes an audio bitstream and a video bitstream and may include additional bitstreams such as ECMs. At block 1404, a possible playout splice point is identified within the media stream. At block 1406, an audio bitstream splice point is identified within the audio bitstream as a function of the possible playout splice point. At block 1408, the audio bitstream is packetized into audio IP packets with one of the audio IP packets having an IP packet boundary that corresponds to the audio bitstream splice point. At block 1410, a video bitstream splice point is identified within the video bitstream as a function of the possible playout splice point, wherein the video bitstream splice point is temporally different from the audio bitstream splice point. At block 1412, the video bitstream is packetized into video IP packets with one of the video IP packets having an IP packet boundary that corresponds to the video bitstream splice point. At block 1414, a reference to the audio bitstream splice point is generated. At block 1416, a reference to the video bitstream splice point is generated. At block 1418, the audio bitstream splice point reference, the video bitstream splice point reference, the audio IP packets, and the video IP packets are transmitted to a splicer. Although not included in FIG. 14, additional steps can be added for an "other" bitstream or bitstreams. For example, the method could include identifying an "other" bitstream splice point within the "other" bitstream as a function of the possible playout splice point, packetizing the "other" bitstream into IP packets containing only "other" data with one of the IP packets having an IP packet boundary that corresponds to the "other" bitstream splice point, generating a reference to the "other" bitstream splice point, and transmitting the "other" IP packets and the reference to a splicer.

In an embodiment, the conditioner/marker 22 is configured to identify the possible playout splice points within the original media stream, to identify the audio and video bitstream splice points as a function of the possible playout splice point, and to packetize the audio and video bitstreams into audio-only and video-only IP packets, with one of the audio IP packets having an IP packet boundary that corresponds to the audio bitstream splice point and one of the video IP packets having an IP packet boundary that corresponds to the video bitstream splice point. The conditioner/mark 22 may also identify other content-specific points as a function of the possible playout splice point and packetize the corresponding other data into IP packets that contain only the corresponding data, with one of the content-specific IP packets having an IP packet boundary that corresponds to the content-specific splice point. In an embodiment, the point of interest producer 150 is configured to generate references to the audio and video bitstream splice points and a transmitter (not shown) within a PE device is configured to transmit the audio bitstream splice point reference, the video bitstream splice point reference, the audio IP packets, and the video IP packets to a splicer.

The above-described technique for conditioning a media stream with content-specific splice points is applicable to multicast and unicast video applications as well as broadcast video. Additionally, the technique is not limited to ad-insertion applications. That is, the technique is applicable to conditioning any media stream for insertion of a different media stream. Additionally, possible playout splice points can be identified at locations other than locations identified by SCTE 35 cue tones.

It should also be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a requesting computer (e.g., a customer or client) by way of data signals embodied in a carrier wave or other propagation medium via a communication link (e.g., a modem or network connection).

Furthermore, although the present invention has been described in conjunction with specific embodiments, those of ordinary skill in the computer networking arts will appreciate that numerous modifications and alterations are well within the scope of the present invention. For example, it is appreciated that the video streams of the foregoing description may be either encrypted or unencrypted signals. In the case of encrypted signaling, ordinary encryption/decryption devices may be incorporated into one or more of the devices described above. Accordingly, the specification and drawings are to be regarded in an illustrative rather than a restrictive sense.

What is claimed is:

1. A method for conditioning a media stream for splicing, the method comprising:
   receiving a media stream comprising transport packets carrying packetized elementary stream (PES) packets of an audio bitstream and a video bitstream;
   identifying a possible playout splice point within the media stream, wherein identifying the possible splice point comprises identifying a point of interest in the media stream;
   identifying an audio bitstream splice point within the audio bitstream as a function of the possible playout splice point, wherein identifying the audio bitstream splice point further comprises identifying a transport packet of the media stream carrying an audio bitstream PES packet corresponding to the audio bitstream splice point;
   packetizing the identified transport packet carrying portions of the audio bitstream splice point into audio IP packets, wherein packetizing the identified transport packet carrying portions of the audio bitstream splice point comprises packetizing the audio bitstream PES packet corresponding to the audio bitstream splice point into the audio IP packets such that one of the audio IP packets has an IP packet boundary that corresponds to the audio bitstream splice point, wherein packetizing into the audio IP packets further comprises truncating the one of the audio IP packets at the audio bitstream splice point, wherein packetizing the PES packet corresponding to the audio bitstream splice point further comprises not adding silence information to the audio IP packets;
   identifying a video bitstream splice point within the video bitstream as a function of the possible playout splice point, wherein identifying the video bitstream splice point further comprises identifying a transport packet in the media stream carrying a video bitstream PES packet corresponding to the video bitstream splice point;
   packetizing the identified transport packet carrying portions of the video bitstream splice point into video IP packets, wherein packetizing the identified transport packet carrying portions of the video bitstream splice point comprises packetizing the video PES packet corresponding to the video bitstream splice point into the video IP packets such that one of the video IP packets has an IP packet boundary that corresponds to the video bitstream splice point, wherein packetizing into the video IP packets comprises truncating the one of the video IP packets at the audio bitstream splice point, wherein packetizing the PES packet corresponding to the video bitstream splice point further comprises not adding black information to the video IP packets;
   generating a reference to the audio bitstream splice point;
   generating a reference to the video bitstream splice point; and
   transmitting the audio bitstream splice point reference, the video bitstream splice point reference, the audio IP packets, and the video IP packets to a splicer.

2. The method of claim 1 wherein the audio bitstream splice point temporally leads the video bitstream splice point.

3. The method of claim 1 wherein the audio bitstream splice point temporally leads the video bitstream splice point by an encoder-specific time interval.

4. The method of claim 1 wherein the audio bitstream splice point reference, the video bitstream splice point reference, the audio IP packets, and the video IP packets are transmitted in MPEG-TS compliant flows.

5. The method of claim 1 wherein the audio bitstream splice point reference and the video bitstream splice point reference are transmitted to the splicer in a stream of packets that is separate from the audio IP packets and the video IP packets.

6. The method of claim 1 wherein the audio bitstream splice point reference and the audio IP packets are transmitted to the splicer in a first combined stream and the video bitstream splice point reference and the video IP packets are transmitted to the splicer in a second combined stream.

7. The method of claim 6 wherein the audio bitstream splice point reference is transmitted in the header of a transport layer packet of the first combined stream and the video bitstream splice point reference is transmitted in the header of a transport layer packet of the second combined stream.

8. The method of claim 7 wherein the audio bitstream splice point reference and the video bitstream splice point reference are carried in an RTP header using RTP header extensions.

9. The method of claim 1 further comprising identifying multiple possible playout splice points within the media stream and identifying separate audio and video bitstream splice points for each of the multiple possible playout splice points.

10. The method of claim 1 wherein the audio bitstream splice point reference temporally leads the audio bitstream splice point in the transmission to the splicer and wherein the video bitstream splice point reference temporally leads the video bitstream splice point in the transmission to the splicer.

11. The method of claim 1 further comprising signaling a clock discontinuity at each splice point.

12. The method of claim 1 further comprising embedding a pointer into an RTP header that points to PCR/PTS/DTS references within the media stream.

13. The method of claim 1 further comprising transmitting a reference to a currently playing program, including an original program or a spliced program.

14. A method for conditioning a media stream for splicing, the method comprising:
  receiving a media stream comprising transport packets carrying packetized elementary stream (PES) packets of an audio bitstream and a video bitstream;
  identifying multiple possible playout splice points within the media stream;
  for each possible playout splice point, identifying, as a function of the possible playout splice point, a content-specific splice point for the audio bitstream and a content-specific splice point for the video bitstream, wherein identifying the content-specific splice point for the audio bitstream comprises identifying a transport packet in the media stream carrying an audio bitstream PES packet corresponding to an audio bitstream splice point, and wherein identifying the content-specific splice point for the video bitstream comprises identifying a transport packet in the media stream carrying a video bitstream PES packet corresponding to a video bitstream splice point;
  packetizing the identified transport packet corresponding to the audio bitstream splice point into audio IP packets, wherein packetizing the identified transport packet corresponding to the audio bitstream splice point into the audio IP packets further comprises packetizinq the audio bitstream PES packet corresponding to the audio bitstream splice point into the audio IP packets such that at least one of the audio IP packets has IP packet boundaries that correspond to the content-specific splice points for the audio bitstream, wherein packetizinq into the audio IP packets further comprises truncating the at least one of the audio IP packets at the the audio bitstream splice point, wherein packetizinq the PES packet corresponding to the audio bitstream splice point further comprises not adding silence information to the audio IP packets;
  packetizing the identified transport packet corresponding to the video bitstream splice point into video IP packets, wherein packetizing the identified transport packet corresponding to the video bitstream splice point into the video IP packets further comprises packetizinq the audio bitstream PES packet corresponding to the video bitstream splice point into the video IP packets such that at least one of the video IP packets has IP packet boundaries that correspond to the content-specific splice points for the video bitstream, wherein packetizing into the video IP packets comprises truncating the one of the video IP packets at the the video bitstream splice point, wherein packetizing the PES packet corresponding to the video bitstream splice point further comprises not adding black information to the video IP packets;
  generating references to audio bitstream splice points;
  generating references to video bitstream splice points; and
  transmitting the audio bitstream splice point references, the video bitstream splice point references, the audio IP packets, and the video IP packets to a splicer.

15. A system for conditioning a media stream for splicing, the system comprising:
  a conditioner configured to:
    identify a possible playout splice point within a media stream comprising transport packets carrying packetized elementary stream (PES) packets of an audio bitstream and a video bitstream;
    identify an audio bitstream splice point within the audio bitstream as a function of the possible playout splice point, wherein the conditioner being configured to identify the audio bitstream splice point further comprises the conditioner being configured to identify a transport packet of the media stream carrying an audio bitstream PES packet corresponding to the audio bitstream splice point;
    packetize the identified transport packet carrying the audio bitstream PES packet corresponding to the audio bitstream splice point into audio IP packets, wherein the conditioner being configured to packetize the transport packet carrying the audio bitstream PES packet comprises the conditioner being configured to packetizing the audio bitstream PES packet carrying the audio bitstream splice point into the audio IP packets such that one of the audio IP packets has an IP packet boundary that corresponds to the audio bitstream splice point, wherein the conditioner being configured to packetize the audio bitstream PES packet into the audio IP packets comprises the conditioner being configured to truncate the one of the audio IP packets at the audio bitstream splice point, wherein packetizinq the PES packet corresponding to the audio bitstream splice point further comprises not adding silence information to the video IP packets;
    identify a video bitstream splice point within the video bitstream as a function of the possible playout splice point, wherein the conditioner being configured to identify the video bitstream splice point comprises the conditioner being configured to identify a transport packet in the media stream carrying a video bitstream PES packet corresponding to the video bitstream splice point; and
    packetize the identified transport packet carrying the video bitstream PES packet corresponding to the video bitstream splice point into video IP packets, wherein the conditioner being configured to packetize the transport packet carrying the audio bitstream PES packet comprises the conditioner being configured to packetize the video bitstream PES packet into the video IP packets such that one of the video IP packets has an IP packet boundary that corresponds to the video bitstream splice point, wherein the conditioner being configured to packetize the video bitstream PES packet into the video IP packets comprises the conditioner being configured to truncate the one of the video IP packets at the video bitstream splice point, wherein packetizing the PES packet corresponding to the video bitstream splice point further comprises not adding black information to the video IP packets;

a point of interest producer configured to:
  generate a reference to the audio bitstream splice point; and
  generate a reference to the video bitstream splice point; and a transmitter configured to transmit the audio bitstream splice point reference, the video bitstream splice point reference, the audio IP packets, and the video IP packets to a splicer.

16. The system of claim 15 wherein the audio bitstream splice point temporally leads the video bitstream splice point.

17. The method of claim 15 wherein the audio bitstream splice point temporally leads the video bitstream splice point by an encoder-specific time interval.

18. The system of claim 15 wherein the audio bitstream splice point reference and the video bitstream splice point reference are transmitted to the splicer in a stream of packets that is separate from the audio IP packets and the video IP packets.

19. The system of claim 15 wherein the audio bitstream splice point reference and the audio IP packets are transmitted to the splicer in a first combined stream and the video bitstream splice point reference and the video IP packets are transmitted to the splicer in a second combined stream.

20. The method of claim 19 wherein the audio bitstream splice point reference is transmitted in the header of a transport layer packet of the first combined stream and the video bitstream splice point reference is transmitted in the header of a transport layer packet of the second combined stream.

* * * * *